United States Patent
Kasaura et al.

(10) Patent No.: US 7,584,360 B2
(45) Date of Patent: Sep. 1, 2009

(54) DATA SENDING/RECEIVING DEVICE AND DIGITAL CERTIFICATE ISSUING METHOD

(75) Inventors: Tsuyoshi Kasaura, Tokyo (JP); Sadayuki Inoue, Tokyo (JP); Soichiro Matsumoto, Tokyo (JP); Tetsuro Shida, Tokyo (JP); Toshimitsu Sato, Tokyo (JP); Masahiro Tsujishita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 49 days.

(21) Appl. No.: 10/589,400

(22) PCT Filed: Nov. 5, 2004

(86) PCT No.: PCT/JP2004/016388

§ 371 (c)(1),
(2), (4) Date: Aug. 14, 2006

(87) PCT Pub. No.: WO2005/078990

PCT Pub. Date: Aug. 25, 2005

(65) Prior Publication Data

US 2007/0162741 A1    Jul. 12, 2007

(30) Foreign Application Priority Data

Feb. 16, 2004    (JP)    .............................. 2004-038000

(51) Int. Cl.
H04L 29/06    (2006.01)
(52) U.S. Cl. ..................... 713/175; 713/156
(58) Field of Classification Search .................. 713/156, 713/175
See application file for complete search history.

(56) References Cited

U.S. PATENT DOCUMENTS 5,771,352 A    6/1998    Nakamura et al.

(Continued)

FOREIGN PATENT DOCUMENTS

JP    7-336370 A    12/1995

(Continued)

OTHER PUBLICATIONS

"Self-Organized Public-Key Management for Mobile Ad Hoc Networks", IEEE Transactions on Mobile Computing, vol. 2, No. 1, Mar. 2003, pp. 52-64, especially 1 Introduction, 3.1 Creation of Public Keys and Public-Key Certificates.

*Primary Examiner*—Kambiz Zand
*Assistant Examiner*—Amare Tabor
(74) *Attorney, Agent, or Firm*—Birch, Stewart, Kolasch & Birch, LLP

(57) ABSTRACT

A management unit (110) which issues a digital certificate to a new transmission unit (410) includes a wireless communication section for performing communication in a network (300) and a wire communication section to which the new transmission unit (410) can be connected; when the new transmission unit (410) is wire-connected to the management unit (110), it is judged in accordance with the received device type information of the new transmission unit (410), whether or not the new transmission unit (410) is a device having a communication means that can communicate in the network (300); and if the new transmission unit is judged as a device having that type of means, the management unit creates a digital certificate by using a device identifier specific to the new transmission unit (410), and sends the digital certificate to the new transmission unit (410).

15 Claims, 13 Drawing Sheets

U.S. PATENT DOCUMENTS

| | | | |
|---|---|---|---|
| 6,223,291 B1 * | 4/2001 | Puhl et al. | 726/28 |
| 6,463,534 B1 * | 10/2002 | Geiger et al. | 713/168 |
| 6,772,331 B1 * | 8/2004 | Hind et al. | 713/151 |
| 6,823,454 B1 * | 11/2004 | Hind et al. | 713/168 |
| 6,826,690 B1 * | 11/2004 | Hind et al. | 713/186 |
| 7,386,721 B1 * | 6/2008 | Vilhuber et al. | 713/156 |
| 2002/0147819 A1 | 10/2002 | Miyakoshi et al. | |
| 2003/0149874 A1 | 8/2003 | Balfanz et al. | |
| 2003/0196084 A1 * | 10/2003 | Okereke et al. | 713/156 |

FOREIGN PATENT DOCUMENTS

| | | |
|---|---|---|
| JP | 2002-159053 A | 5/2002 |
| JP | 2002-359623 A | 12/2002 |
| JP | 2003-005641 A | 1/2003 |
| JP | 2003-500923 A | 1/2003 |
| JP | 2003-188873 A | 7/2003 |
| JP | 2003-198544 A | 7/2003 |
| JP | 2003-309558 A | 10/2003 |
| WO | WO-00/72506 A1 | 11/2000 |

* cited by examiner

DATA SENDING/RECEIVING DEVICE AND DIGITAL CERTIFICATE ISSUING METHOD

TECHNICAL FIELD

The present invention relates to a method of issuing a digital certificate to a new data sending/receiving device when the new data sending/receiving device participates in a network including data sending/receiving devices each having a digital certificate, and a data sending/receiving device implementing the method.

BACKGROUND ART

IEEE802.11 standard provides Open System Authentication and Shared Key Authentication as device authentication methods in a wireless LAN (Local Area Network). Open System Authentication prescribes the exchange of authenticated frames among the wireless terminals. However, since all terminals that request authentication are permitted in Open System Authentication, unauthorized access from a malicious third party cannot be blocked by Open System Authentication. Shared Key Authentication prescribes the advance sharing of a passphrase used as a shared key among the wireless terminals, but does not prescribe a sharing method. Generally, a user obtains the shared key notified verbally or distributed by an electronic mail and sets a passphrase used as the shared key on the wireless terminal.

Further, IEEE802.11i standard and WPA (Wi-Fi Protect Access) standard that are intended to strengthen security of a wireless LAN, provide device authentication using an authentication server in RADIUS (Remote Authentication Dial In User Service) or other authentication servers. The wireless terminal that requests authentication sends an authentication request by wireless to a base station connected to the wired network. The base station asks the authentication server included in the wired network by wire communication whether an authentication can be granted or not. For the sake of the authentication of the wireless terminal, terminal information such as a MAC (Media Control Access) address of the wireless terminal that requests authentication must be stored in the authentication server beforehand.

Furthermore, patent document 1 mentioned below discloses the entry of wireless terminal information by wireless communication using a public key cryptosystem.

Moreover, patent document 2 mentioned below discloses a technology for grouping terminals that have the identical common information by sharing the common information and for authenticating the terminals with reference to a group list.

Further, patent document 3 mentioned below discloses a technology for performing the public key authentication in accordance with a MAC address list held by a base station (AP), by using a public key certificate set in each terminal beforehand.

Patent document 1: Japanese Patent Application Kokai (Laid-Open) Publication No. 2002-159053
Patent document 2: Japanese Patent Application Kokai (Laid-Open) Publication No. 2003-198544
Patent document 3: Japanese Patent Application Kokai (Laid-Open) Publication No. 2003-005641

DISCLOSURE OF THE INVENTION

Problems to be Solved by the Invention

However, in the methods described above, since the entered information is not transmitted by a communication means that can be judged as having reliable security from unauthorized access by a third party, there is a problem that there is a danger of disguise by eavesdropping or tampering.

Further, it is a terminal user that enters a passphrase for the wireless terminal and the terminal information for the authentication server, and there is a problem that it is difficult for typical home users to perform these operations.

The present invention has been provided to solve the problems of the above-described prior art. It is an object of the present invention to provide a method of issuing a digital certificate to a new data sending/receiving device, by a simple operation, while ensuring security against unauthorized access from the outside, when a new data sending/receiving device participates in a network formed by data sending/receiving devices each having a digital certificate, and a data sending/receiving device implementing the method.

Means for Solving the Problems

The data sending/receiving device of the present invention issues a digital certificate to a new data sending/receiving device, when the data sending/receiving device causes the new data sending/receiving device to participate in a network formed by data sending/receiving devices each having a digital certificate that certifies authority to participate in the network. The data sending/receiving device includes: a first communication section which performs communication in the network; a second communication section, to which the new data sending/receiving device can be connected; and a control section which performs a process of issuing the digital certificate. When the new data sending/receiving device is connected to the second communication section, the control section judges whether or not the new data sending/receiving device is a device having a communication means that can communicate in the network, in accordance with device type information of the new data sending/receiving device received via the second communication section from the new data sending/receiving device. If the new data sending/receiving device is judged as a device having a communication means that can communicate in the network, the control section creates the digital certificate for the new data sending/receiving device by using a device identifier specific to the new data sending/receiving device, the device identifier being received via the second communication section from the new data sending/receiving device, and sends the created digital certificate via the second communication section to the new data sending/receiving device.

Another data sending/receiving device of the invention issues a digital certificate to a new data sending/receiving device, when the data sending/receiving device causes the new data sending/receiving device to participate in a network formed by data sending/receiving devices each having a digital certificate that certifies authority to participate in the network. The data sending/receiving device includes a communication section which performs communication in the network; and a control section which performs a process of issuing the digital certificate. If the new data sending/receiving device is judged as a device having a communication means that can communicate in the network, the control section creates a digital certificate for the new data sending/receiving device by using a device identifier specific to the new data sending/receiving device, the device identifier being received via the data sending/receiving device to which the new data sending/receiving device is connected and via the communication section from the new data sending/receiving device, and controls to send the created digital certificate via the communication section and via the data sending/receiving device to which the new data sending/receiving device is connected.

EFFECT OF THE INVENTION

According to the present invention, when a new data sending/receiving device is caused to participates in a network formed by data sending/receiving devices each having a digital certificate, a digital certificate can be issued to the new data sending/receiving device while security against unauthorized access from the outside is ensured.

Moreover, according to the present invention, a digital certificate can be obtained by a simple operation of connecting a new data sending/receiving device to a data sending/receiving device having a digital certificate.

DESCRIPTION OF THE REFERENCE SYMBOLS

100, 200 wired network; 110 management unit; 116 digital certificate; 120, 220, 230 connected device; 210 transmission unit; 216 digital certificate; 300 wireless network; 410 new transmission unit; 416 digital certificate.

BEST MODE FOR CARRYING OUT THE INVENTION

First Embodiment

Figure 1:
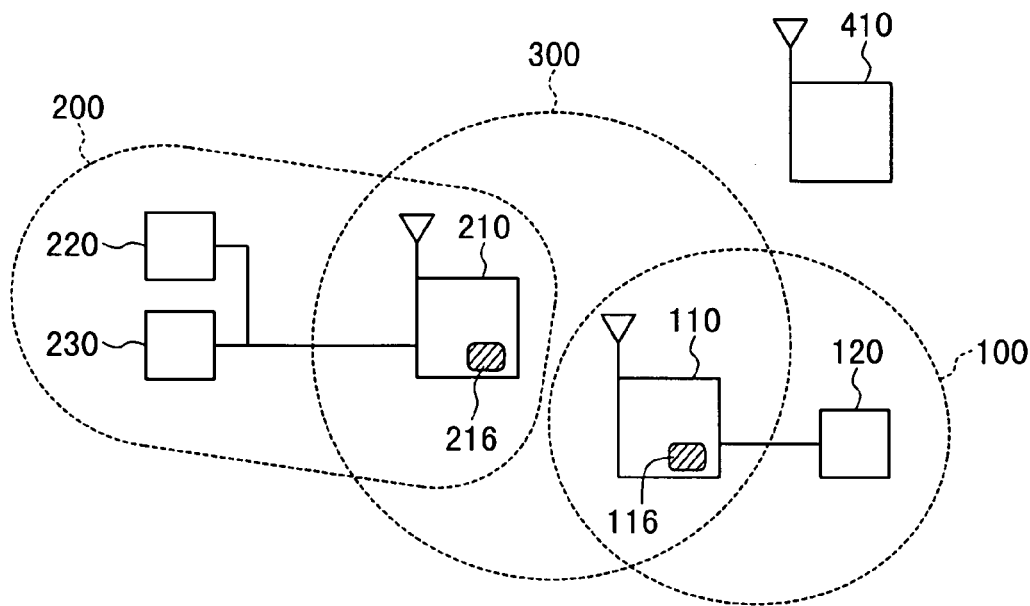
FIG. 1 is a diagram showing a configuration implementing a digital certificate issuing method according to the first and second embodiments of the present invention.

FIG. 1 is a diagram showing a configuration for implementing a digital certificate issuing method according to the first embodiment of the present invention. A network 300 shown in FIG. 1 is a network, security of which is secured against unauthorized access from a malicious third party by using digital certificates 116 and 216 which are data for certifying the authority to participate in the network. The network 300 can be an IEEE802.11 network, for example. In the first embodiment, the network 300 is a wireless network that carries out communication by radio waves, infrared rays, or the like. The wireless network 300 includes a management unit (a transmission unit having a network management function) 110 that is a data sending/receiving device for issuing a digital certificate certifying the authority to participate in a network, and a transmission unit 210 that is another data sending/receiving device. The number of the transmission units forming the wireless network is not limited to two, but the number of the transmission units may be any number except for two. The management unit 110 has the digital certificate 116 certifying the authority to participate in the wireless network 300, and the transmission unit 210 has a digital certificate 216 certifying the authority to participate in the wireless network 300.

Further, in FIG. 1, each of the networks 100 and 200 is a network formed by communication means, by which the user can be convinced of apparent security against unauthorized access from the outside from a malicious third party, and is an IEEE1394 network, for example. In the first embodiment, the networks 100 and 200 are wired networks. The wired network 100 includes a management unit 110 and a device 120 connected to the management unit 110 by a communication cable or the like. Furthermore, the wired network 200 includes a transmission unit 210 and devices 220 and 230 wire-connected to the transmission unit 210 by a communication cable or the like. Although FIG. 1 shows a case where the devices 220 and 230 are connected directly to the transmission unit 210, the transmission unit 210, the device 220, and the device 230 may be connected in series. Each of the transmission units 110, 210, and 410 is a communication device having a wireless communication function, such as a mobile telephone, a personal computer (PC), a PC peripheral device, and a video device (a broadcast receiver, a video recording/reproducing device, a video display device, etc.). Moreover, the configuration of the wired networks 100 and 200 is not limited to that shown in FIG. 1.

Operations when the device 120 in the wired network 100 communicates data with the devices 220 and 230 in the wired network 200 via the wireless network 300 will be described. The data sent from the device 120 is received via a communication cable by the management unit 110. The management unit 110 that received the data requests the transmission unit 210 to present the digital certificate, and certifies that the transmission unit 210 is a device having the authority to participate in the wireless network 300 by receiving the digital certificate 216 presented by the transmission unit 210. Further, the transmission unit 210 requests the management unit 110 to present the digital certificate, and certifies that the management unit 110 is a device having the authority to participate in the wireless network 300 by receiving the digital certificate 116 presented by the management unit 110. After cross-certification of the management unit 110 and the transmission unit 210 is finished, the management unit 110 sends the data received from the device 120 to the transmission unit 210, by wireless communication using the wireless network 300. The transmission unit 210 that received the data sends the data through the communication cable to the devices 220 and 230. Furthermore, in data transmission from the device 220 or 230 to the device 120, data can be sent using the similar manner. By the above-described process, the device 120 in the wired network 100 and the devices 220 and 230 in the wired network 200 can perform data communication via the wireless network 300. In FIG. 1, since the new transmission unit 410 does not have a digital certificate certifying the authority to participate in the wireless network 300, the new transmission unit 410 cannot perform wireless data communication with the management unit 110 or the transmission unit 210.

Figure 2:
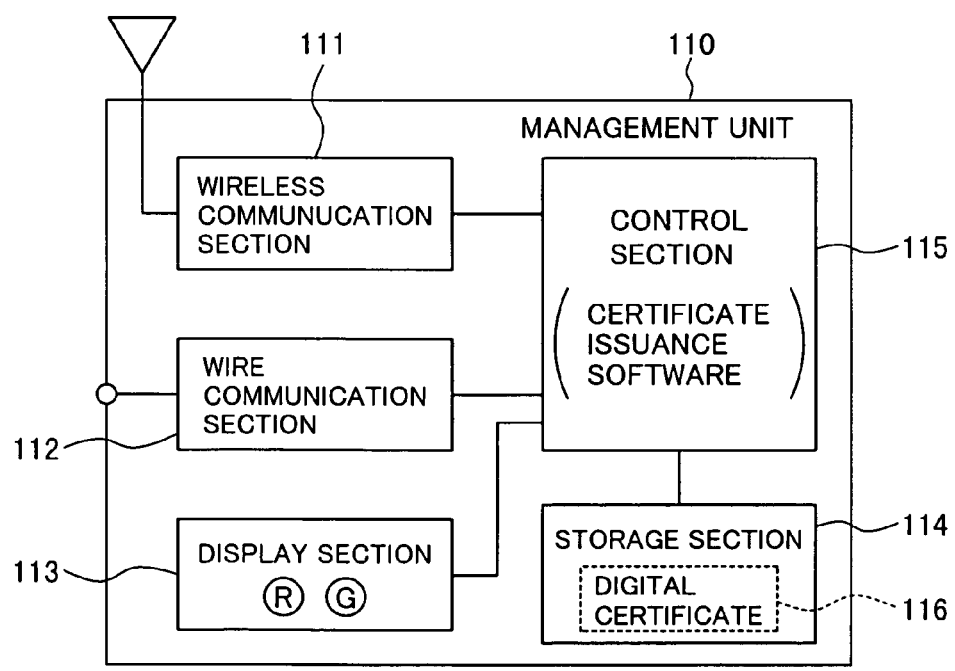
FIG. 2 is a block diagram schematically showing a configuration of a management unit shown in FIG. 1.

FIG. 2 is a block diagram schematically showing a configuration of the management unit 110. As shown in FIG. 2, the management unit 110 has the digital certificate 116 certifying the authority to participate in the wireless network 300. As shown in FIG. 2, the management unit 110 includes a wireless communication section 111 (e.g., an IEEE802.11-compliant wireless LAN circuit) for performing communication in the wireless network 300, a wire communication section 112 (e.g., an IEEE1394-compliant interface circuit) to which either or both of the device 120 and the new transmission unit 410 can be wire-connected, a display section 113 such as a liquid crystal screen and a display lamp, a storage section 114 such as a semiconductor memory, and a control section 115 for controlling the operation of the entire device. When the management unit 110 causes a new transmission unit 410 to participate in the wireless network 300, the management unit 110 issues a digital certificate to the new transmission unit 410. When issuing the digital certificate, the management unit 110 operates in accordance with, for example, a digital certificate issuance software.

Figure 3:
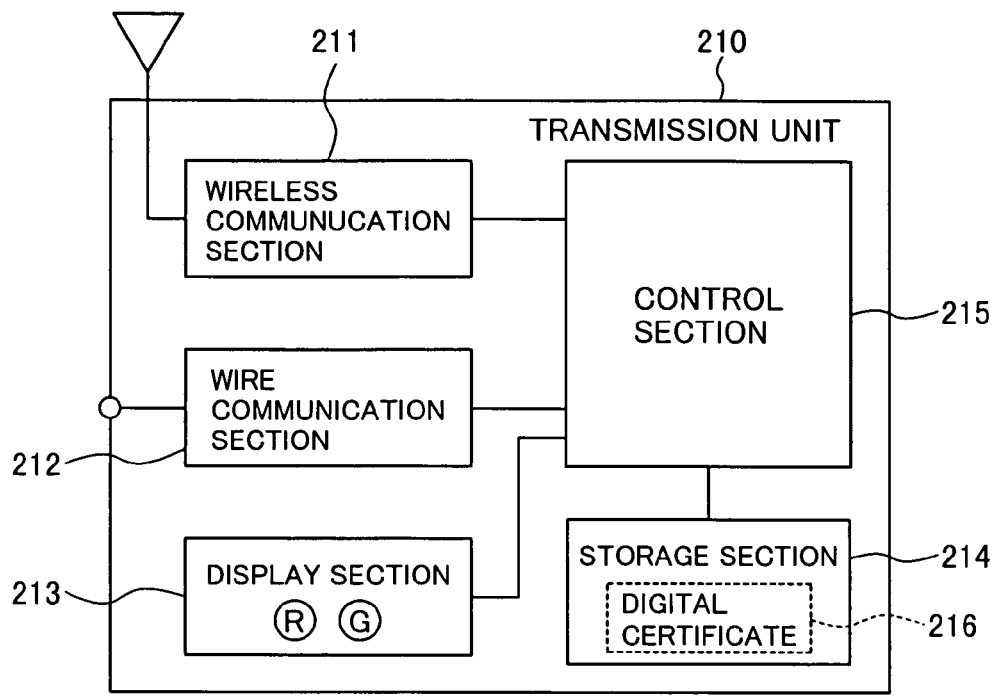
FIG. 3 is a block diagram schematically showing a configuration of a new transmission unit that requests a digital certificate issuance and is shown in FIG. 1.

FIG. 3 is a block diagram schematically showing a configuration of the transmission unit 210. As shown in FIG. 3, the transmission unit 210 has the digital certificate 216 which certifies the authority to participate in the wireless network 300. As shown in FIG. 3, the transmission unit 210 includes a wireless communication section 211 (e.g., an IEEE802.11-compliant wireless LAN circuit) for performing communication in the wireless network 300, a wire communication section 212 (e.g., an IEEE1394-compliant interface circuit) to which one or more of the devices 220 and 230 and the new transmission unit 410 can be wire-connected, a display section 213 such as a liquid crystal screen and a display lamp, a storage section 214 such as a semiconductor memory, and a control section 215 for controlling the operation of the entire device.

Figure 4:
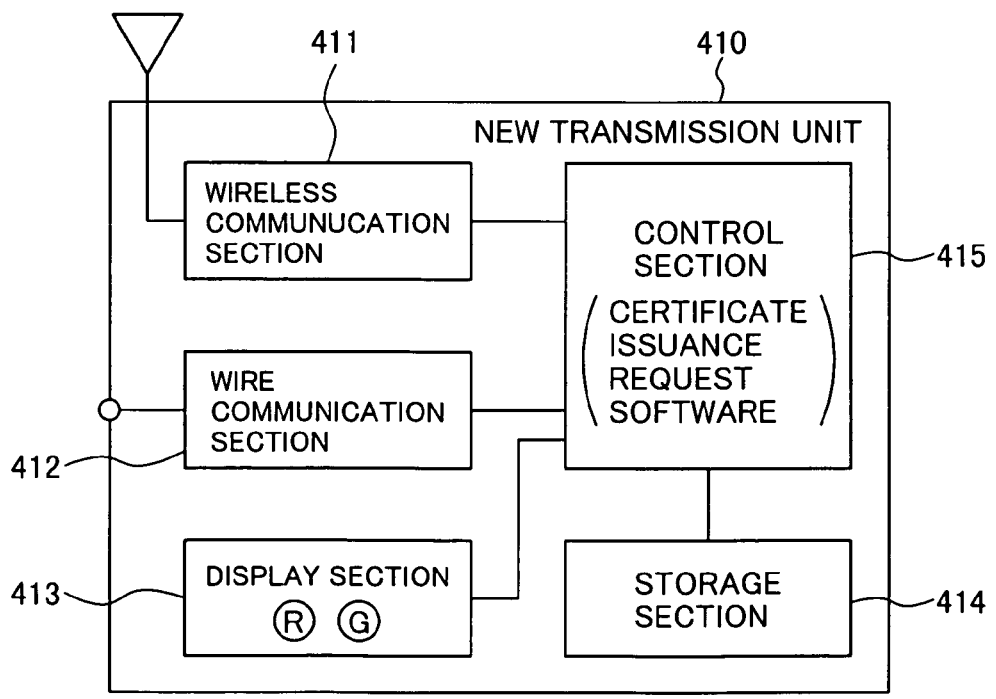
FIG. 4 is a block diagram schematically showing a configuration of a transmission unit shown in FIG. 1.

FIG. 4 is a block diagram schematically showing a configuration of the new transmission unit 410. As shown in FIG. 4, at first, the new transmission unit 410 does not have a digital certificate certifying the authority to participate in the wireless network 300. As shown in FIG. 4, the new transmission unit 410 includes a wireless communication section 411 (e.g., an IEEE802.11-compliant wireless LAN circuit) for performing communication in a wireless network, a wire communication section 412 (e.g., an IEEE1394-compliant interface circuit) which can be wire-connected to the management unit 110 and the like, a display section 413 such as a liquid crystal screen and a display lamp, a storage section 414 such as a semiconductor memory, and a control section 415 for controlling the operation of the entire device. When receiving the digital certificate issuance, the new transmission unit 410 operates in accordance with, for example, a digital certificate requesting software.

Figure 5:
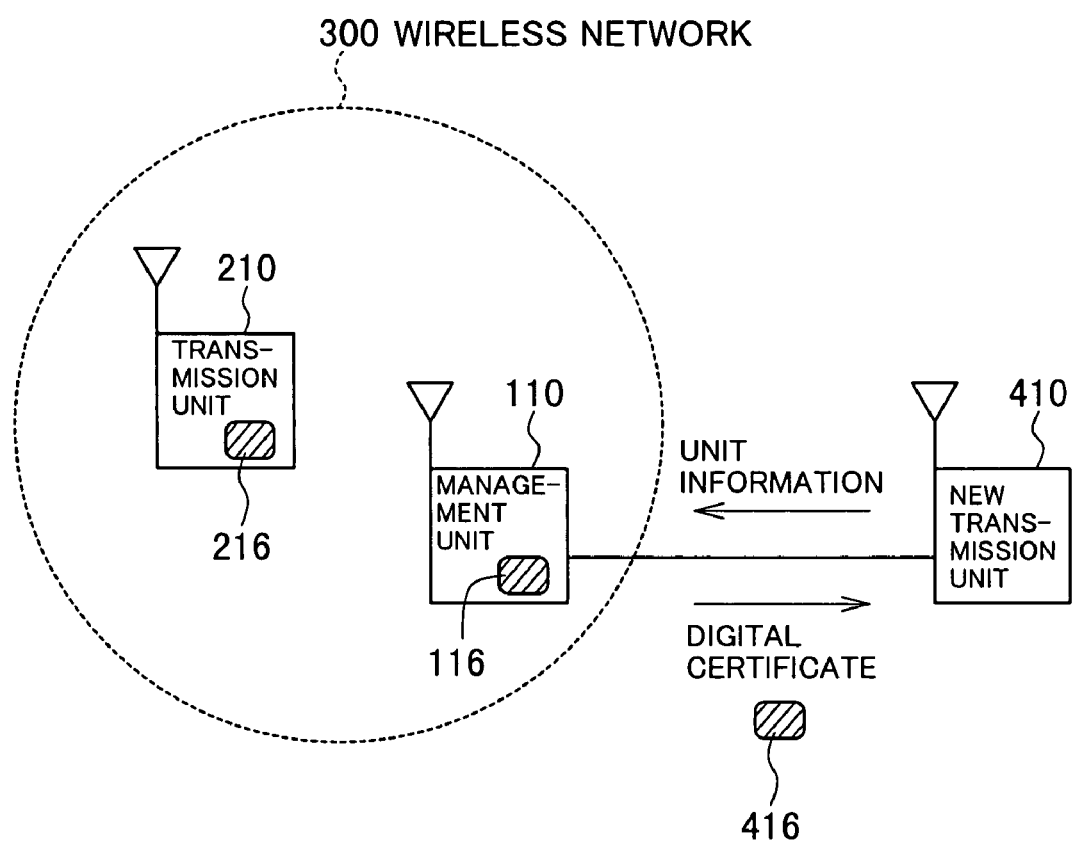
FIG. 5 is a configuration diagram for describing the digital certificate issuing method according to the first embodiment.

FIG. 5 is a configuration diagram for describing the digital certificate issuing method according to the first embodiment. General operations when the new transmission unit 410 not having a digital certificate certifying the authority to participate in the wireless network 300 receives from the management unit 110 the issued digital certificate 416 certifying the authority to participate in the wireless network 300 will be described with reference to FIG. 5.

The user first connects the wire communication section 412 of the new transmission unit 410 and the wire communication section 112 of the management unit 110 by using, for example, an IEEE1394-compliant communication cable. The user can be convinced of apparent security of the new transmission unit 410 and the management unit 110 against unauthorized access from a malicious third party, by directly connecting the wire communication section 412 of the new transmission unit 410 and the wire communication section 212 of the transmission unit 210 by means of a communication cable.

After the new transmission unit 410 is connected, the management unit 110 receives the device type information of the new transmission unit 410. The management unit 110 judges whether or not the new transmission unit 410 is a device having a communication means that can communicate in the wireless network 300 in accordance with the device type information of the new transmission unit 410. Further, the management unit 110 receives a device identifier (unit information) which is device information specific to the new transmission unit 410.

When the management unit 110 judges that the new transmission unit 410 is a device having a communication means that can communicate in the wireless network 300, the management unit 110 creates a digital certificate 416 by using the device identifier of the new transmission unit 410 and sends the created digital certificate 416 to the new transmission unit 410. Now, the management unit 110 terminates the process of issuing the digital certificate 416 to the new transmission unit 410.

Figure 6:
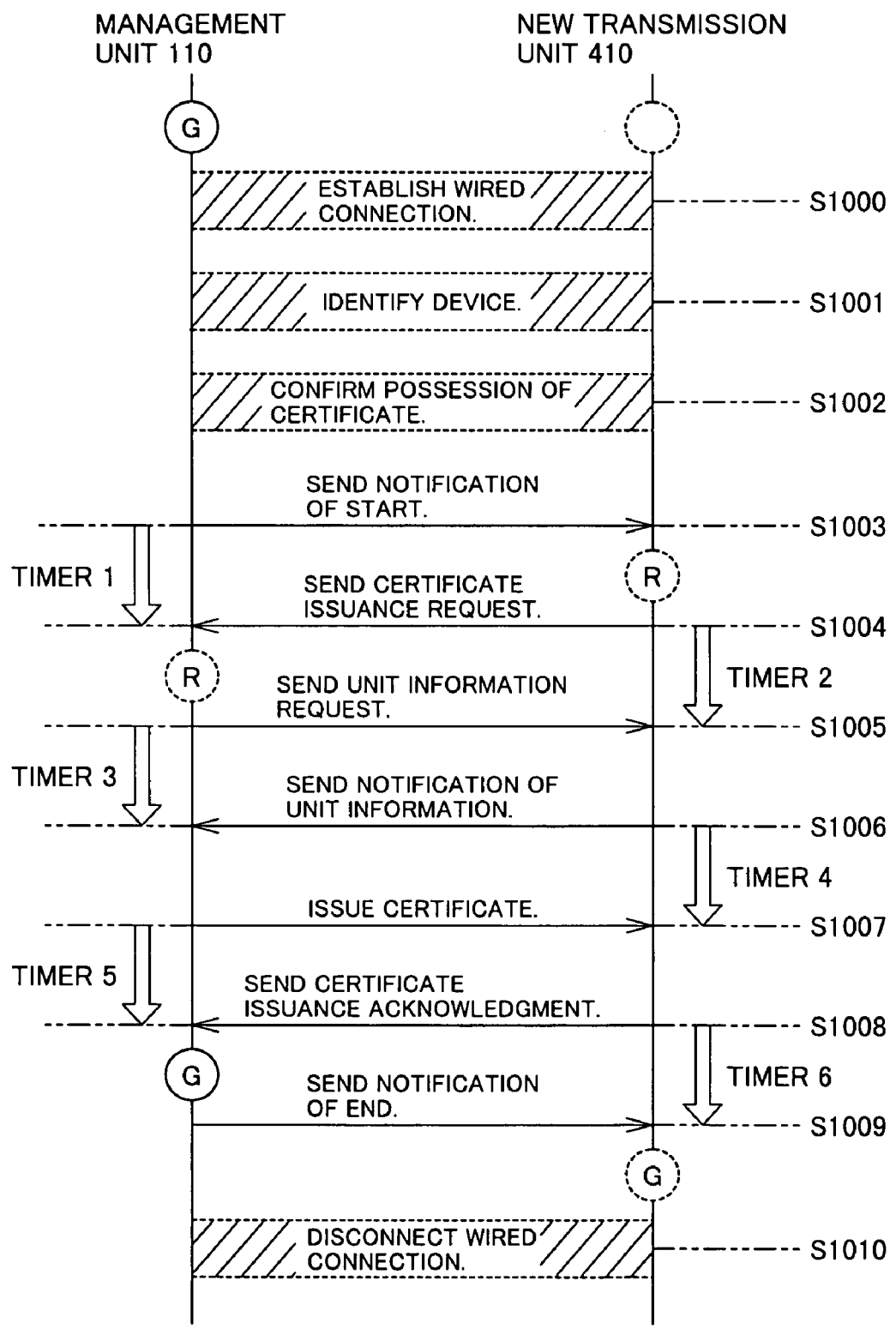
FIG. 6 is a diagram showing processes in the digital certificate issuing method according to the first embodiment.

FIG. 6 is a diagram showing the processes of the digital certificate issuing method according to the first embodiment. Sending and receiving operations of the digital certificate when the new transmission unit 410 is connected to the management unit 110 that issues the digital certificate will be described below with reference to FIG. 6.

In the first embodiment, each of the management unit 110 and the new transmission unit 410 has a green (G) lamp and a red (R) lamp as a display section for notifying the user of the current status. A drawing method of the lamp status in the figures is described in the following items (1) to (5).

(1) "A mark composed of only a blank dashed circle" indicates a lamp off-state, and means that the transmission unit has no digital certificate.

(2) "A mark composed of the letter G with a dashed circle" indicates a green lamp flashing-state, and means that the transmission unit has a digital certificate, but is not participating in the wireless network 300.

(3) "A mark composed of the letter G with a solid circle" indicates a green lamp on-state, and means that the transmission unit has a digital certificate and is participating in the wireless network 300.

(4) "A mark composed of the letter R with a dashed circle" indicates a red lamp flashing-state, and means that the process of issuing the digital certificate is in progress.

(5) "A mark composed of the letter R with a solid circle" indicates a red lamp on-state, and means that the process of issuing the digital certificate ended abnormally without issuing a digital certificate.

In FIG. 6, solid horizontal arrows extending between the management unit 110 and the new transmission unit 410 denote the wire communication.

As shown in FIG. 6, first in the process of issuing a digital certificate, the management unit 110 and the new transmission unit 410 are wire-connected by a communication cable (step S1000). At this time, since the management unit 110 has the digital certificate 116 and is participating in the wireless network 300, the display section of the management unit 110 is in a green lamp on-state. On the other hand, since the new transmission unit 410 has no digital certificate and is not participating in the wireless network 300, the display section of the new transmission unit 410 is in a lamp off-state.

Next, the management unit 110 judges whether or not the wire-connected device (new transmission unit 410) is a transmission unit having a communication means that can communicate in the wireless network 300 (step S1001). This device identification step will be described later in detail (step S1103 in FIG. 7, and FIG. 8).

Next, the management unit 110 confirms whether or not the wire-connected new transmission unit 410 already has a digital certificate (step S1002). This confirmation step of possession of the digital certificate will be described later in detail (step S1104 in FIG. 7, and FIG. 9).

Next, the management unit 110 sends a notification of start for notifying the new transmission unit 410 that the digital certificate issuance process flow starts, and starts a timer 1 (step S1003). The new transmission unit 410 that received the notification of start, switches the display section of the new transmission unit 410 to a red lamp flashing-state, to inform the user that the digital certificate issuance process flow is in progress.

Next, the new transmission unit 410 sends a digital certificate issuance request to the management unit 110 and starts a timer 2 (step S1004). The management unit 110 that received the digital certificate issuance request, switches the display section of the management unit 110 to a red lamp flashing-state, to inform the user that the digital certificate issuance process flow is in progress, and stops the timer 1. If the management unit 110 receives no digital certificate issuance request before the time-out of the timer 1, the management unit 110 executes its time-out process. The time-out process will be described later (steps S1117 to S1121 in FIG. 7).

The management unit 110 that received the digital certificate issuance request before the time-out of the timer 1, sends a unit information request to the new transmission unit 410 in order to obtain unit information which is specific to the new transmission unit 410 and is to be written in the digital certificate, and starts a timer 3 (step S1005). The new transmission unit 410 that received the unit information request stops the timer 2. If the new transmission unit 410 receives no unit information request before the time-out of the timer 2, the new transmission unit 410 executes its time-out process. The time-out process will be described later (steps S1419 to S1423 in FIG. 10).

The new transmission unit 410 that received the unit information request before the time-out of the timer 2, sends the unit information to the management unit 110, and starts a timer 4 (step S1006). The unit information includes a device identifier specific to the transmission unit, such as a MAC (Media Control Access) address. The management unit 110 that received the unit information stops the timer 3. If the management unit 110 receives no unit information before the time-out of the timer 3, the management unit 110 executes its time-out process. The time-out process will be described later (steps S1117 to S1121 in FIG. 7).

The management unit 110 that received the unit information before the time-out of the timer 3, creates a digital certificate in accordance with the received unit information, issues the digital certificate to the new transmission unit 410, and starts a timer 5 (step S1007). The new transmission unit 410 that received the digital certificate stops the timer 4. If the new transmission unit 410 receives no digital certificate before the time-out of the timer 4, the new transmission unit 410 executes its time-out process. The time-out process will be described later (steps S1419 to S1423 in FIG. 10).

The new transmission unit 410 that received the digital certificate before the time-out of the timer 4, verifies the content of the received digital certificate. If the new transmission unit 410 has confirmed the validity of the digital certificate (the validity is verified by a digital certificate authentication office, which is an independent organization, for example), the new transmission unit 410 sends a digital certificate issuance acknowledgment notifying that the digital certificate has been normally received to the management unit 110, and starts a timer 6 (step S1008). If the content of the digital certificate is invalid, the new transmission unit 410 sends the digital certificate issuance acknowledgment containing the unit information again. The management unit 110 that received the digital certificate issuance acknowledgment, stops the timer 5, and switches the display section of the management unit 110 to a green lamp on-state again. If the new transmission unit 410 receives no digital certificate issuance acknowledgment before the time-out of the timer 5, the new transmission unit 410 executes its time-out process. The time-out process will be described later, (steps S1419 to S1423 in FIG. 10).

If the validity of the digital certificate is verified, the management unit 110 that received the digital certificate issuance acknowledgment before the time-out of the timer 5, sends a notification of end which causes the new transmission unit 410 to stop the digital certificate issuance process flow (step S1008). The new transmission unit 410 that received the notification of end, stops the timer 6. If the new transmission unit 410 receives no notification of end before the time-out of the timer 6, the new transmission unit 410 executes its time-out process. The time-out process will be described later (steps S1419 to S1423 in FIG. 10). In step S1008 of FIG. 6, if the issued digital certificate is invalid, the management unit 110 that received the digital certificate issuance acknowledgment creates a digital certificate again in accordance with the unit information included in the received digital certificate issuance acknowledgment, returns its process to step S1006, and issues a digital certificate again to the new transmission unit 410.

The new transmission unit 410 that received the notification of end before the time-out of the timer 6, switches the display section of the new transmission unit 410 to a green lamp flashing-state, and notifies the user that the digital certificate issuance process flow normally ended and the new transmission unit 410 obtained the digital certificate. After seeing the green lamp flashing-state, the user can disconnect the wired connection between the management unit 110 and the new transmission unit 410 (step S1010). If the new transmission unit 410 receives no notification of end before the time-out of the timer 6, the new transmission unit 410 executes its time-out process. The time-out process will be described later (steps S1419 to S1423 in FIG. 10).

With the process flow described above, the new transmission unit 410 can obtain the digital certificate 416 required to participate in the wireless network 300 shown in FIG. 5, from the management unit 110.

Figure 7:
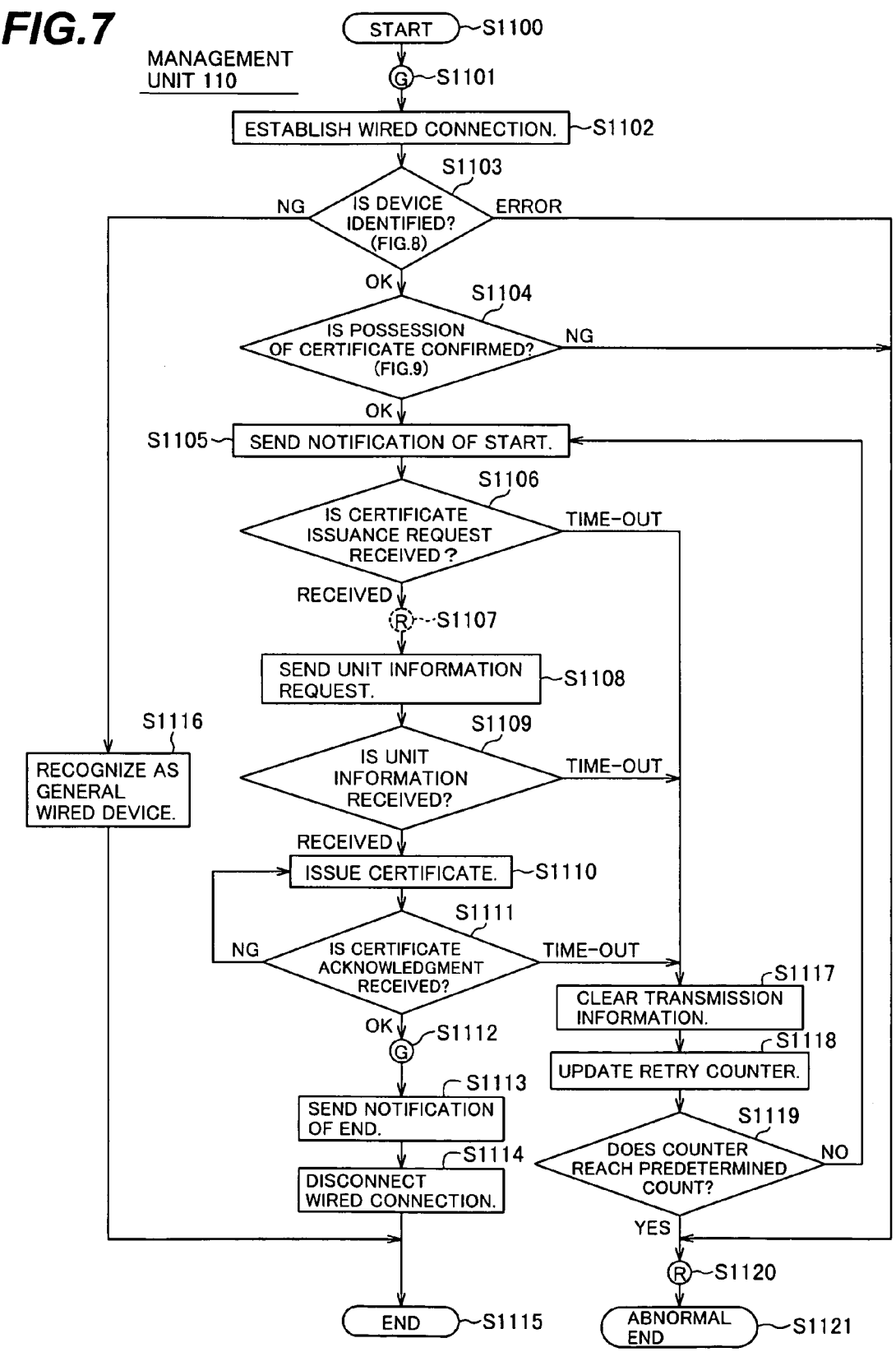
FIG. 7 is a flow chart showing operations of a management unit in the digital certificate issuing method according to the first embodiment.
Figure 8:
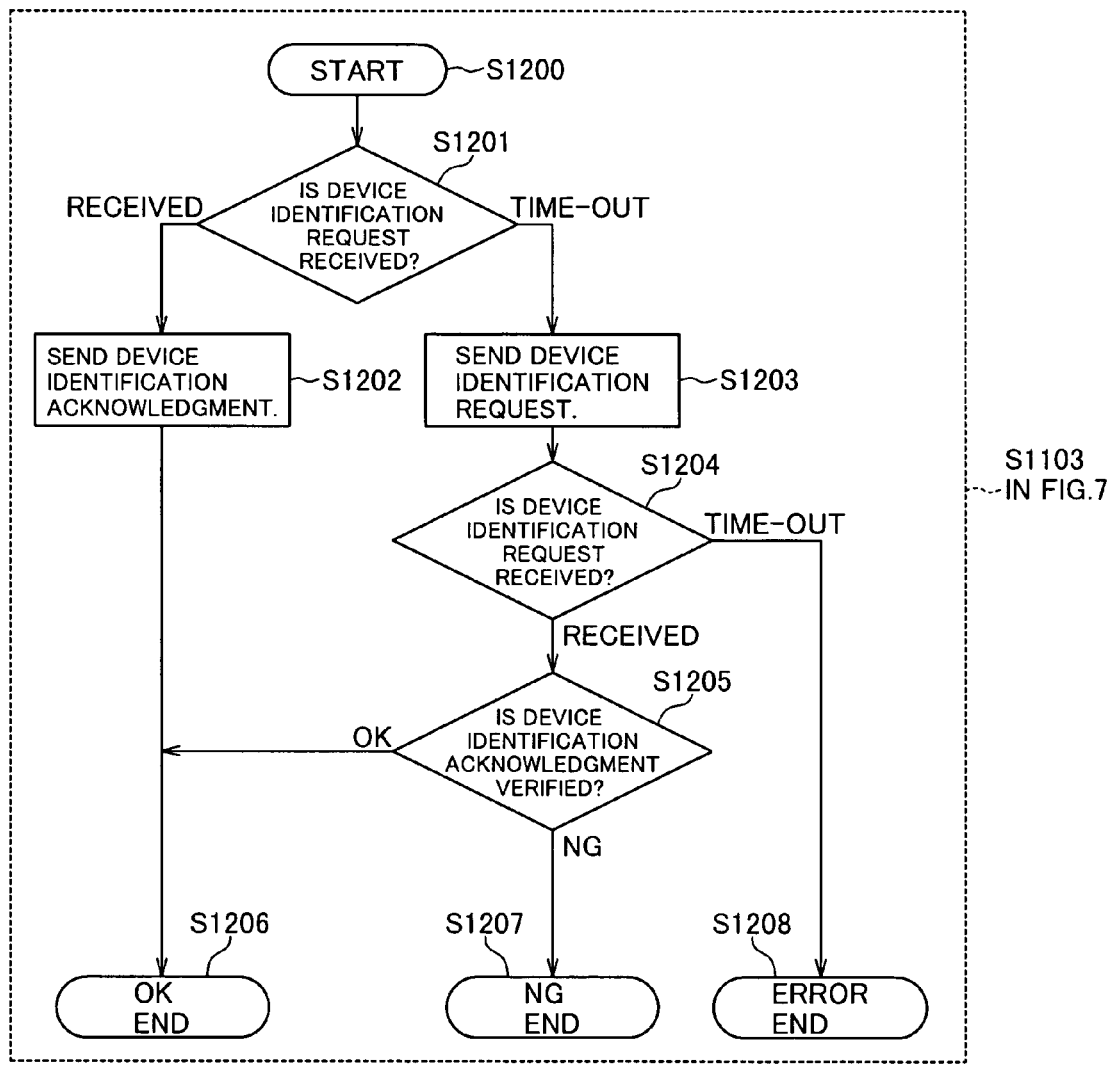
FIG. 8 is a flow chart showing a device identification process shown in FIG. 7.
Figure 9:
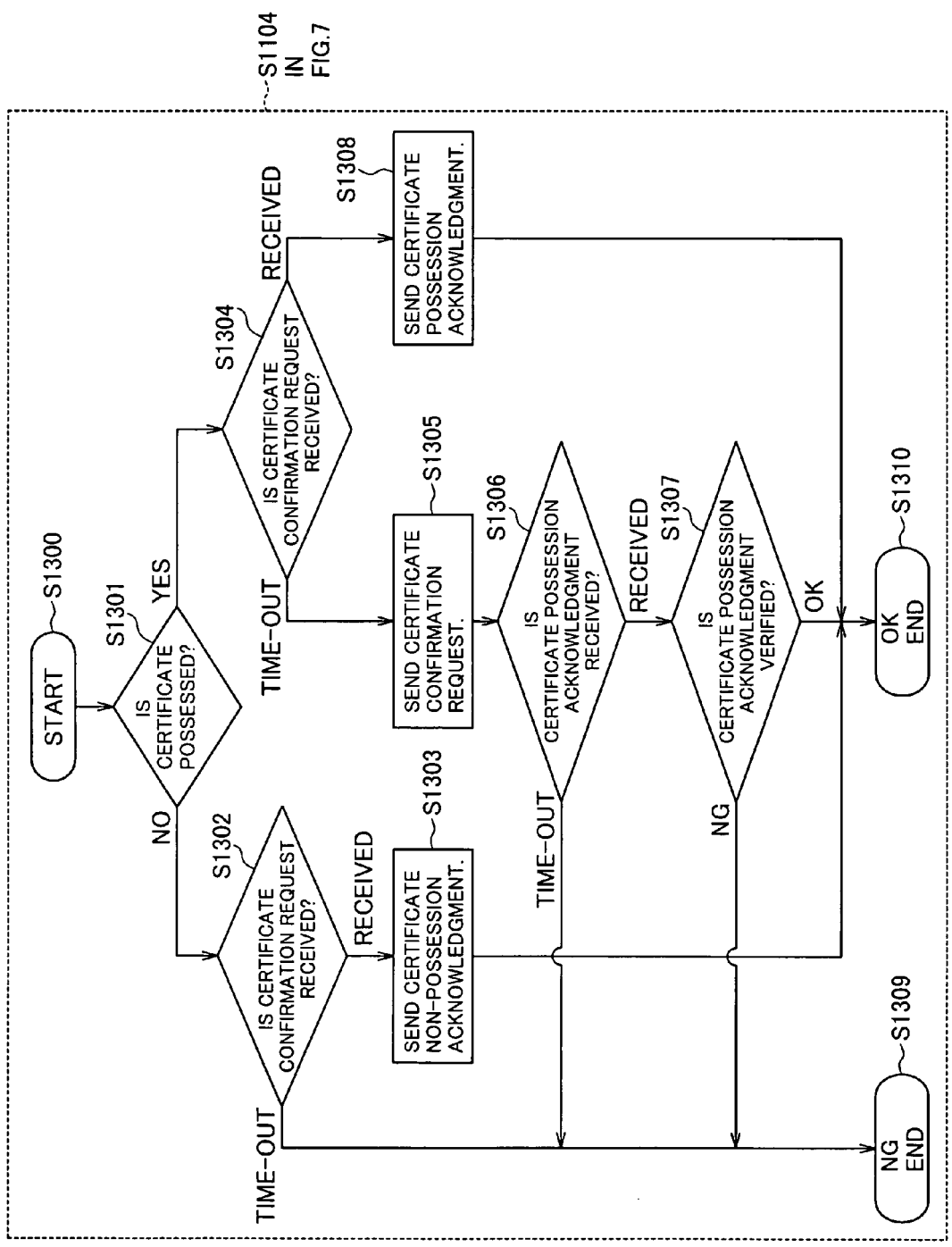
FIG. 9 is a flow chart showing a confirmation process of possession of the digital certificate shown in FIG. 7.

FIG. 7 is a flow chart showing the process used when the management unit 110 issues a digital certificate to the new transmission unit 410 wire-connected to the management unit 110. Further, FIG. 8 is a flow chart showing the device identification process of step S1103 in FIG. 7, and FIG. 9 is a flow chart showing the confirmation process of possession of the digital certificate of step S1104 in FIG. 7. With reference to FIG. 7 to FIG. 9, operations of the management unit 110 in the first embodiment will be described in detail.

As shown in FIG. 7, when the process of issuing a digital certificate starts (step S1100), the management unit 110 has the digital certificate and is participating in the wireless network 300, and the display section of the management unit 110 is in a green lamp on-state (step S1101). Next, the user wire-connects the management unit 110 and the new transmission unit 410 by a cable, which the user can be convinced of reliable security from the viewpoint of the network security (step S1102).

Next, the management unit 110 performs process to determine whether or not the wire-connected new transmission unit 410 is a transmission unit having a communication means that can communicate with the wireless network 300 (step S1103 in FIG. 7 and steps S1200 to S1208 in FIG. 8).

If the management unit 110 received a device identification request from the connected new transmission unit 410 within a predetermined period of time in step S1201 of FIG. 8, the management unit 110 sends a device identification acknowledgment indicating that the new transmission unit 410 can participate in the wireless network 300 (i.e., the transmission unit is a device having a communication means unit that can communicate in the wireless network 300) to the connected new transmission unit 410 (step S1202), and the device identification process flow ends (step S1206). The end of the device identification process flow in step S1206 indicates that the new transmission unit 410 is judged as being a transmission unit that can communicate in the wireless network 300, and is referred to as a network participation allowable end (indicated as "OK END" in the figure).

If the management unit 110 receives no device identification request from the connected new transmission unit 410 within a predetermined period of time in step S1201 of FIG. 8, the management unit 110 sends a device identification request to the new transmission unit 410 (step S1203). If the management unit 110 received a device identification acknowledgment from the connected new transmission unit 410 within a predetermined period of time in step S1204 of FIG. 8, the management unit 110 verifies the device identification acknowledgment (step S1205). If the new transmission unit 410 is a transmission unit having a communication means that can communicate in the wireless network 300 in step S1201 of FIG. 8, the device identification process flow ends, allowing the transmission unit to participate in the network (OK END) (step S1206). The management unit 110 verifies the device identification acknowledgment in step S1205 of FIG. 8. If the new transmission unit 410 is not a transmission unit that can communicate in the wireless network 300, the device identification process flow ends (step S1207). The end of the device identification process flow in step S1207 indicates that the new transmission unit 410 cannot communicate in the wireless network 300, and is referred to as a network participation unallowable end (indicated as "NG END" in the figure).

If the management unit 110 receives no device identification acknowledgment corresponding to the sent device identification request from the connected device within a predetermined period of time in step S1204 of FIG. 8, the management unit 110 judges that a time-out has occurred and terminates the device identification process flow (step S1208). The end of the device identification process flow in step S1208 indicates that the management unit 110 has not received the judgment as to whether or not the new transmission unit 41 can communicate in the wireless network 300, and is referred to as an "ERROR END".

If the device identification process flow comes to the network participation unallowable end (NG END) in step S1103 of FIG. 7, the connected device is not a transmission unit that can communicate in the wireless network 300 but a general wired device. Therefore, the management unit 110 judges that a wired device is added to the wired network (step S1116) and terminates the digital certificate issuance process flow, without issuing the digital certificate (step S1115).

If the device identification process flow comes to an ERROR END in step S1103 of FIG. 7, the management unit 110 switches the display section to a red lamp on-state to notify the user that the digital certificate issuance process flow ended abnormally (steps S1120 and S1121).

If the device identification process flow comes to the network participation allowable end (OK END) in step S1103 of FIG. 7, the management unit 110 confirms whether or not the wire-connected new transmission unit 410 already has a digital certificate (step S1104 in FIG. 7 and steps S1300 to S1310 in FIG. 9). FIG. 9 shows the confirmation process flow of possession of the digital certificate, by which the management unit 110 confirms whether or not the wire-connected new transmission unit 410 already has a digital certificate (steps S1300 to S1310).

In step S1301 of FIG. 9, the management unit 110 confirms whether or not the new transmission unit 410 has a digital certificate. If the new transmission unit 410 has no digital certificate, the management unit 110 confirms whether or not a digital certificate confirmation request is received from the connected new transmission unit 410 within a predetermined period of time (step S1302). If the management unit receives no digital certificate confirmation request within a predetermined period of time, the management unit 110 terminates the confirmation process flow of possession of the digital certificate (step S1309). The end of the confirmation process flow of possession of the digital certificate shown in step S1309 indicates that the confirmation process flow of possession of the digital certificate does not end normally. As a result, the new transmission unit 410 cannot participate in the wireless network 300, and is referred to as a network participation unallowable end (indicated as "NG END" in the figure).

If the management unit 110 receives the digital certificate confirmation request within a predetermined period of time in step S1302 of FIG. 9, a digital certificate non-possession acknowledgment indicating that the unit does not have the digital certificate is sent to the connected new transmission unit 410 (step S1303), and the confirmation process flow of possession of the digital certificate ends (step S1310). The end of the confirmation process flow of possession of the digital certificate shown in step S1303 or S1310 indicates that the confirmation process flow of possession of the digital certificate has normally ended. As a result, the new transmission unit 410 is judged as being a transmission unit which can participate in the wireless network 300, and therefore the process flow comes to a network participation allowable end (indicated as "OK END" in the figure).

If it is confirmed in step S1301 of FIG. 9 that the new transmission unit 410 has the digital certificate, the management unit 110 judges whether or not it received a digital certificate confirmation request from the connected new transmission unit 410 within a predetermined period of time (step S1304). If the management unit 110 received the digital certificate confirmation request, the management unit 110 sends a digital certificate possession acknowledgment indicating that the unit has the digital certificate to the connected new transmission unit 410 in step S1308 and terminates the confirmation process flow of possession of the digital certificate (step S1310). The end of the confirmation process flow of possession of the digital certificate shown in step S1308 or S1310 indicates that the confirmation process flow of possession of the digital certificate has normally ended. As a result, the new transmission unit 410 is judged as being a transmission unit which can participate in the wireless network 300. The process flow comes to a network participation allowable end (OK END).

If the management unit 110 receives no digital certificate confirmation request within a predetermined period of time in step S1304 of FIG. 9, the management unit 110 sends a digital certificate confirmation request to the connected new transmission unit 410 in step S1305 to confirm whether or not the new transmission unit 410 has the digital certificate.

In step S1306 of FIG. 9, the management unit 110 judges whether or not it received the digital certificate possession acknowledgment corresponding to the digital certificate confirmation request sent in step S1305 within a predetermined period of time from the connected new transmission unit 410. If it is judged in step S1306 of FIG. 9 that the management unit 110 receives no digital certificate possession acknowledgment within a predetermined period of time, the confirmation process flow of possession of the digital certificate comes to a network participation unallowable end (NG END) (step S1309).

If it is judged in step S1306 of FIG. 9 that the management unit 110 received the digital certificate possession acknowledgment within a predetermined period of time, the management unit 110 verifies the received digital certificate possession acknowledgment in step S1307. If it is verified that the connected new transmission unit 410 has the same digital certificate as the digital certificate of the wireless network including the management unit 110, a digital certificate does not need to be issued. The management unit 110 brings the confirmation process flow of possession of the digital certificate to a network participation unallowable end (NG END) (step S1309).

If the verification of the received digital certificate possession acknowledgment in step S1307 of FIG. 9 indicates that the connected new transmission unit 410 does not have a digital certificate or has a digital certificate different from the digital certificate of the wireless network including the management unit 110, the management unit 110 brings the confirmation process flow of possession of the digital certificate to a network participation allowable end (OK END) in order to issue a new digital certificate (step S1310).

If the confirmation process flow of possession of the digital certificate comes to a network participation unallowable end (NG END) in step S1104 of FIG. 7, the management unit 110 switches the display section to a red lamp on-state (step S1120) to inform the user that the digital certificate issuance process flow ended abnormally (step S1121).

If the confirmation process flow of possession of the digital certificate is brought to a network participation allowable end (OK END) in step S1104 of FIG. 7, the process of FIG. 7 proceeds to step S1105, and the management unit 110 sends a notification of start that is information indicating the start of the digital certificate issuance process flow to the new transmission unit 410.

In step S1106 of FIG. 7, the management unit 110 judges whether or not a digital certificate issuance request is received from the new transmission unit 410 within a predetermined period of time. If the management unit 110 receives no digital certificate issuance request within a predetermined period of time, the process proceeds to the time-out process of steps S1117 to S1121. If an acknowledgment from the new transmission unit 410 cannot be received because of the time-out in step S1106 of FIG. 7, the management unit 110 clears all the information received after the notification of start in step S1105 (step S1117). After the received information is cleared, the management unit 110 updates a retry counter which indicates the number of retries of the digital certificate issuance process flow (step S1118). After updating the retry counter, the management unit 110 confirms whether or not the retry counter has reached a predetermined count (step S1119). If the retry counter has not reached the predetermined count, the management unit 110 causes the process to go back to step S1105 and sends the notification of start to the new transmission unit 410 again. If the retry counter has reached the predetermined count, the management unit 110 switches the display section to a red lamp on-state (step S1120) to inform the user of the abnormal end, and terminates the digital certificate issuance process flow (step S1121).

If it is judged in step S1106 of FIG. 7 that the digital certificate issuance request is received within a predetermined period of time, the management unit 110 switches the display section to a red lamp flashing-state (step S1107) to inform the user that the digital certificate issuance process flow is in progress.

In step S1108 of FIG. 7, the management unit 110 sends a unit information request to the new transmission unit 410 in order to obtain the information specific to the transmission unit to be written in the digital certificate.

It is judged in step S1109 of FIG. 7 whether or not the management unit 110 received unit information from the new transmission unit 410 within a predetermined period of time. The unit information includes the device identifier specific to the transmission unit, such as a MAC address. If the management unit 110 has not received the unit information within a predetermined period of time, the process proceeds to the time-out process of steps S1117 to S1121. If it is confirmed in step S1109 of FIG. 7 that the unit information from the new transmission unit 410 has been received, the management unit 110 creates and issues a digital certificate in accordance with the unit information received from the new transmission unit 410 (step S1110).

In the next step S1111 of FIG. 7, the management unit 110 judges whether or not the management unit 110 received a digital certificate acknowledgment indicating that the new transmission unit 410 received the issued digital certificate within a predetermined period of time. If the management unit 110 receives no digital certificate acknowledgment within a predetermined period of time, the management unit 110 causes the process to proceed to the time-out process of steps S1117 to S1121. If the received digital certificate acknowledgment is not accepted in step S1111 of FIG. 7, the management unit 110 creates a digital certificate again in accordance with the unit information included in the digital certificate acknowledgment and causes the process to go back to step S1110 to issue the digital certificate again. If the received digital certificate acknowledgment is accepted, the management unit 110 switches the display section to a green lamp on-state again (step S1112), and causes the process to proceed to the next step S1113.

In step S1113 of FIG. 7, the management unit 110 sends a notification of end indicating the end of the digital certificate issuance process flow to the new transmission unit 410. In step S1114 of FIG. 7, the user checks the display sections of the management unit 110 and the new transmission unit 410, and disconnects the wired connection to terminate the digital certificate issuance process flow (step S1115).

Figure 10:
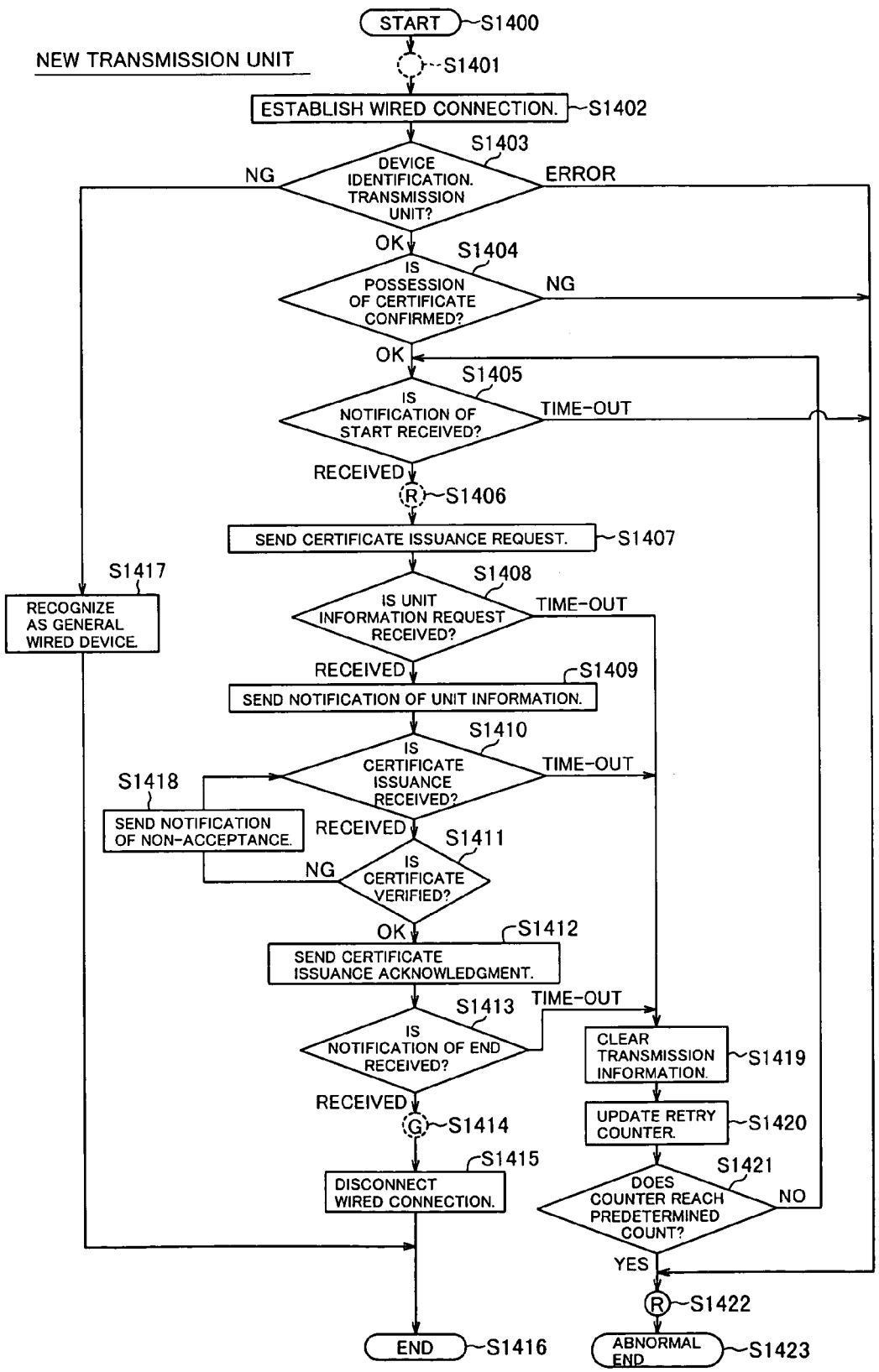
FIG. 10 is a flow chart showing operations of the new transmission unit in the digital certificate issuing method according to the first embodiment.

Operations of the new transmission unit 410 in the first embodiment will be described below in detail. FIG. 10 shows a process flow indicating the procedure by which the new transmission unit 410 wire-connected to the management unit 110 obtains a digital certificate (steps S1400 to S1423).

As shown in FIG. 10, since the new transmission unit 410 has no digital certificate and has not participated in the wireless network 300, the display section is in a lamp off-state (step S1401). In step S1402 of FIG. 10, the user connects the new transmission unit 410 and the management unit 110 by wired connection, by which the user can be convinced of reliable security.

It is judged in step S1403 of FIG. 10 whether or not the wire-connected device (new transmission unit 410) is a device having a communication means that can communicate in the wireless network 300. The device identification process flow is substantially the same as the process flow shown in FIG. 8 described above.

If the device identification process flow proceeds to a network participation unallowable end (NG END) in step S1403 of FIG. 10, the connected device is not a transmission unit that can communicate in the wireless network 300 but a general wired device. Therefore, it is judged that the wired device has been added to the wired network, e.g., the network 100 shown in FIG. 1 (step S1417), the digital certificate is not issued, and the digital certificate issuance process flow ends (step S1416).

If the device identification process flow proceeds to an ERROR END in step S1403 of FIG. 10, the new transmission unit 410 switches the display section to a red lamp on-state (step S1422) to notify the user that the digital certificate issuance process flow ended abnormally, and terminates the digital certificate issuance process flow (step S1423).

If the device identification process flow proceeds to a network participation allowable end (OK END) in step S1403 of FIG. 10 and therefore the connected transmission unit is judged as being capable of communicating in the wireless network 300, it is confirmed whether or not the wire-connected new transmission unit 410 already has a digital certificate in the next step S1404 of FIG. 10. The confirmation process flow of possession of the digital certificate is substantially the same as the process flow shown in FIG. 9 described above.

If the confirmation process flow of possession of the digital certificate proceeds to a network participation unallowable end (NG END) in step S1404 of FIG. 10, the display section is switched to a red lamp on-state (step S1422) to inform the user that the digital certificate issuance process flow ended abnormally, and the digital certificate issuance process flow ends (step S1423).

Since the confirmation process flow of possession of the digital certificate (step S1404) proceeds to a network participation allowable end (OK END) in step S1405 of FIG. 10, the new transmission unit 410 receives a notification of start indicating the start of the digital certificate issuance process flow from the management unit 110. If the notification of start is not received within a predetermined period of time, the new transmission unit 410 switches the display section to a red lamp on-state (step S1422) to inform the user that the digital certificate issuance process flow ended abnormally, and terminates the digital certificate issuance process flow (step S1423). If the notification of start is received within a predetermined period of time in step S1405 of FIG. 10, the new transmission unit 410 switches the display section to a red lamp flashing-state (step S1406) to inform the user that the digital certificate issuance process flow is in progress, and terminates the digital certificate issuance process flow (step S1423).

In step S1407 of FIG. 10, the new transmission unit 410 sends a digital certificate issuance request to the management unit 110. In step S1408 of FIG. 10, the new transmission unit 410 judges whether or not the new transmission unit 410 received a unit information request from the management unit 110 within a predetermined period of time. If the new transmission unit 410 receives no unit information request within a predetermined period of time, the new transmission unit 410 causes the process to proceed to the time-out process of steps S1419 to S1423. If the acknowledgement from the management unit 110 is not received because of a time-out in FIG. 10, the new transmission unit 410 clears all the information received after the notification of start in step S1405 (step S1419). After clearing the received information, the new transmission unit 410 updates the retry counter indicating the number of times the digital certificate issuance process flow is retried (step S1420). After updating the retry counter, the new transmission unit 410 confirms whether or not the retry counter has reached a predetermined count (step S1421). If the retry counter has not reached the predetermined count, the process goes back to step S1405, and the new transmission unit 410 receives the notification of start. If the retry counter reaches a predetermined count, the new transmission unit 410 switches the display section to a red lamp on-state (step S1422) to inform the user of the abnormal end, and terminates the digital certificate issuance process flow (step S1423).

If the unit information request is received within a predetermined period of time in step S1408 of FIG. 10, the new transmission unit 410 sends its specific information to be written in the digital certificate to the management unit 110 in the next step S1409 as a unit information notification. The unit information includes the device identifier of the transmission unit, such as a MAC address.

In step S1410 of FIG. 10, the new transmission unit 410 judges whether or not a digital certificate issuance including the digital certificate created on the basis of the unit information, have been received from the management unit 110 within a predetermined period of time. If the new transmission unit 410 receives no digital certificate issuance within a predetermined period of time, the new transmission unit 410 causes the process to proceed to the time-out process of steps S1419 to S1423.

If the new transmission unit 410 received the digital certificate issuance within a predetermined period of time in step S1410 of FIG. 10, the new transmission unit 410 verifies the content of the digital certificate received from the management unit 110 (step S1411). If the result of verification of the content of the digital certificate indicates that the digital certificate is not the one requested by the issuance request, the new transmission unit 410 sends a notification of non-acceptance to the management unit 110 (step S1418) and causes the process to go back to step S1410 to receive the digital certificate issuance again. If the result of verification of the content of the digital certificate indicates that the digital certificate is the one requested by the issuance request, the new transmission unit 410 sends a digital certificate issuance acknowledgment to the management unit 110 (step S1412).

In step S1413 of FIG. 10, the new transmission unit 410 judges whether or not the new transmission unit 410 received a notification of end indicating the end of the digital certificate issuance process flow from the management unit 110 within a predetermined period of time. If the new transmission unit 410 receives no notification of end within a predetermined period of time, the new transmission unit 410 causes the process to proceed to time-out process of steps S1419 to S1423.

If the notification of end is received within a predetermined period of time in step S1413 of FIG. 10, the new transmission unit 410 switches the display section to a green lamp flashing-state (step S1414) and informs the user that the digital certificate has been obtained. After confirming that the display section was switched to a green lamp flashing-state, the user disconnects the wire connection with the management unit 110 (step S1415) to terminate the digital certificate issuance process flow (step S1416).

As has been described above, with the digital certificate issuing method according to the first embodiment, the process of issuing a digital certificate can be performed while confirming in real time the statuses of the transmission unit, including whether or not the new transmission unit 410 has a digital certificate, whether or not the management unit 110 is participating in the wireless network 300, whether or not the digital certificate issuance process flow is in progress in the management unit 110 or the new transmission unit 410, and whether or not the process flow ended abnormally in the management unit 110 or the new transmission unit 410.

Further, with the digital certificate issuing method of the first embodiment, the new transmission unit 410 is connected to the management unit 110 by wired connection, by which the user can be convinced of reliable security against unauthorized access from a third party. Accordingly, the need for entering a passphrase from the keyboard or the like is eliminated, and a digital certificate required to participate in the wireless network can be obtained through simple operations.

Furthermore, with the digital certificate issuing method of the first embodiment, even when the new transmission unit 410 is judged as being a device having a communication means which can participate in the wireless network 300, if the new transmission unit 410 already has a digital certificate, a new digital certificate is not issued so that unnecessary process can be omitted.

Moreover, with the digital certificate issuing method of the first embodiment, even when the new transmission unit 410 is judged as being a device having a communication means allowed to participate in the wireless network 300 and the new transmission unit 410 already has a digital certificate, if the already held digital certificate is a digital certificate for a network other than the wireless network 300, a digital certificate for the new transmission unit 410 is created by using the device identifier and the created digital certificate is sent to the new transmission unit 410. Accordingly, a digital certificate can be issued with reliability.

Further, with the digital certificate issuing method of the first embodiment, the new transmission unit 410 verifies the validity of the received digital certificate and, if the validity of the received digital certificate is confirmed, the new transmission unit 410 notifies the management unit 110 which has issued the digital certificate that the digital certificate has been accepted. Accordingly, the user can confirm that the digital certificate has been issued. Furthermore, the new transmission unit 410 verifies the validity of the received digital certificate and, if the validity of the received digital certificate is confirmed, the new transmission unit 410 requests the management unit 110 which has issued the digital certificate to issue a digital certificate again. Accordingly, a digital certificate can be issued certainly.

Moreover, in the description given above, the new transmission unit 410 is connected to the management unit 110, but the new transmission unit 410 may also be connected to any wired device (e.g., the device 120 in FIG. 1) other than the management unit 110 in the wired network including the management unit 110.

Additionally, the description given above indicates a case where if the new transmission unit 410 already has a digital certificate of the wireless network including the management unit 110, the process terminates without executing the digital certificate issuance process flow. However, the digital certificate issuance process flow may be executed to issue the digital certificate even when the new transmission unit 410 already has a digital certificate.

Second Embodiment

In the description of the first embodiment, the new transmission unit 410 is wire-connected to the management unit 110 that issues a digital certificate. In contrast to this, in the following description of the second embodiment, the new transmission unit 410 is wire-connected to another transmission unit 210 that is participating in the wireless network 300 including the management unit 110 that issues a digital certificate.

Figure 11:
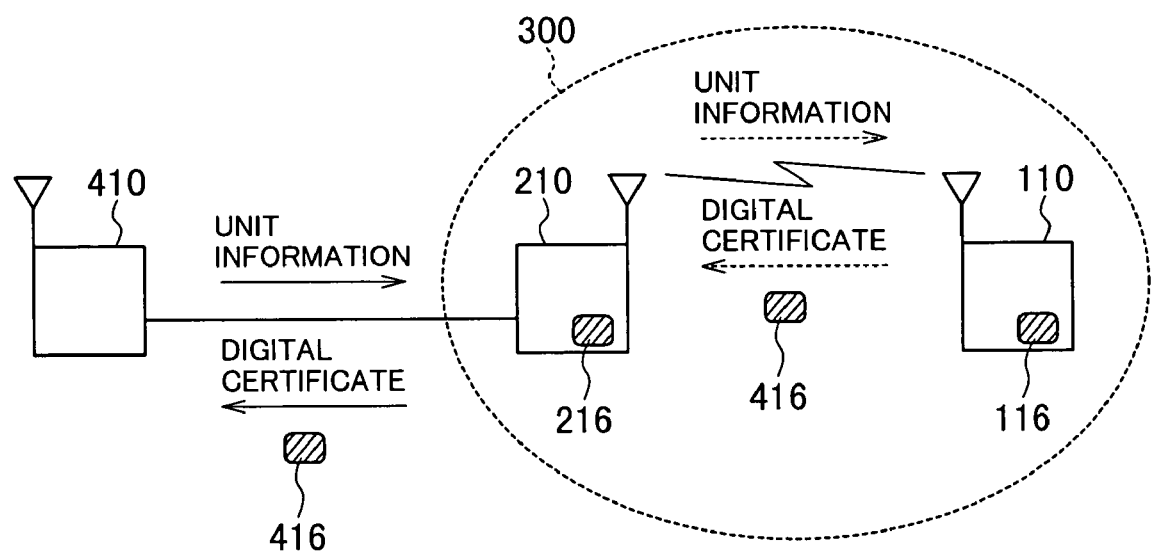
FIG. 11 is a configuration diagram for describing a digital certificate issuing method according to the second embodiment.

FIG. 11 is a configuration diagram for describing a digital certificate issuing method according to the second embodiment of the present invention. In FIG. 11, elements identical to or corresponding to elements shown in FIG. 1 or FIG. 5 (first embodiment) will be denoted by the same reference marks. Further, each of the transmission units 110, 210, and 410 shown in FIG. 11 has substantially the same configuration as each of those described in the first embodiment (FIG. 2 to FIG. 4).

First, general operations performed when the new transmission unit 410 not having a digital certificate certifying the authority to participate in the wireless network 300 obtains through the transmission unit 210 a digital certificate 416 certifying the authority to participate in the wireless network 300 issued by the management unit 110 will be described with reference to FIG. 11. In the description of the second embodiment, FIG. 2 to FIG. 4 are also referred.

The user first connects the wire communication section 412 of the new transmission unit 410 and the wire communication section 212 of the transmission unit 210 by means of an IEEE1394-compliant communication cable, for example. The user can be convinced of apparent security of the new transmission unit 410 and the transmission unit 210 against unauthorized access from the outside by directly connecting the wire communication section 412 of the new transmission unit 410 and the wire communication section 212 of the transmission unit 210 by means of a communication cable. Further, the transmission unit 210 and the management unit 110 can obtain the security against unauthorized access from a malicious third party by giving and receiving the digital certificates and performing communication accordingly.

After the new transmission unit 410 is connected, the transmission unit 210 receives device type information of the new transmission unit 410. The transmission unit 210 judges in accordance with the device type information of the new transmission unit 410 whether or not the new transmission unit 410 is a device having a communication means that can communicate in the wireless network 300. Further, whether or not the new transmission unit 410 is a device having a communication means that can communicate in the wireless network 300 may be determined by the management unit 110 instead of the transmission unit 210. Furthermore, the management unit 110 receives the specific device identifier (unit information) of the new transmission unit 410 through the transmission unit 210.

If the new transmission unit 410 is judged as a device having a communication means that can communicate in the wireless network 300, the management unit 110 creates a digital certificate 416 by using the device identifier of the new transmission unit 410 and sends the created digital certificate 416 through the transmission unit 210 to the new transmission unit 410. Now, the process of issuing the digital certificate 416 for the new transmission unit 410 by means of the management unit 110 ends.

Figure 12:
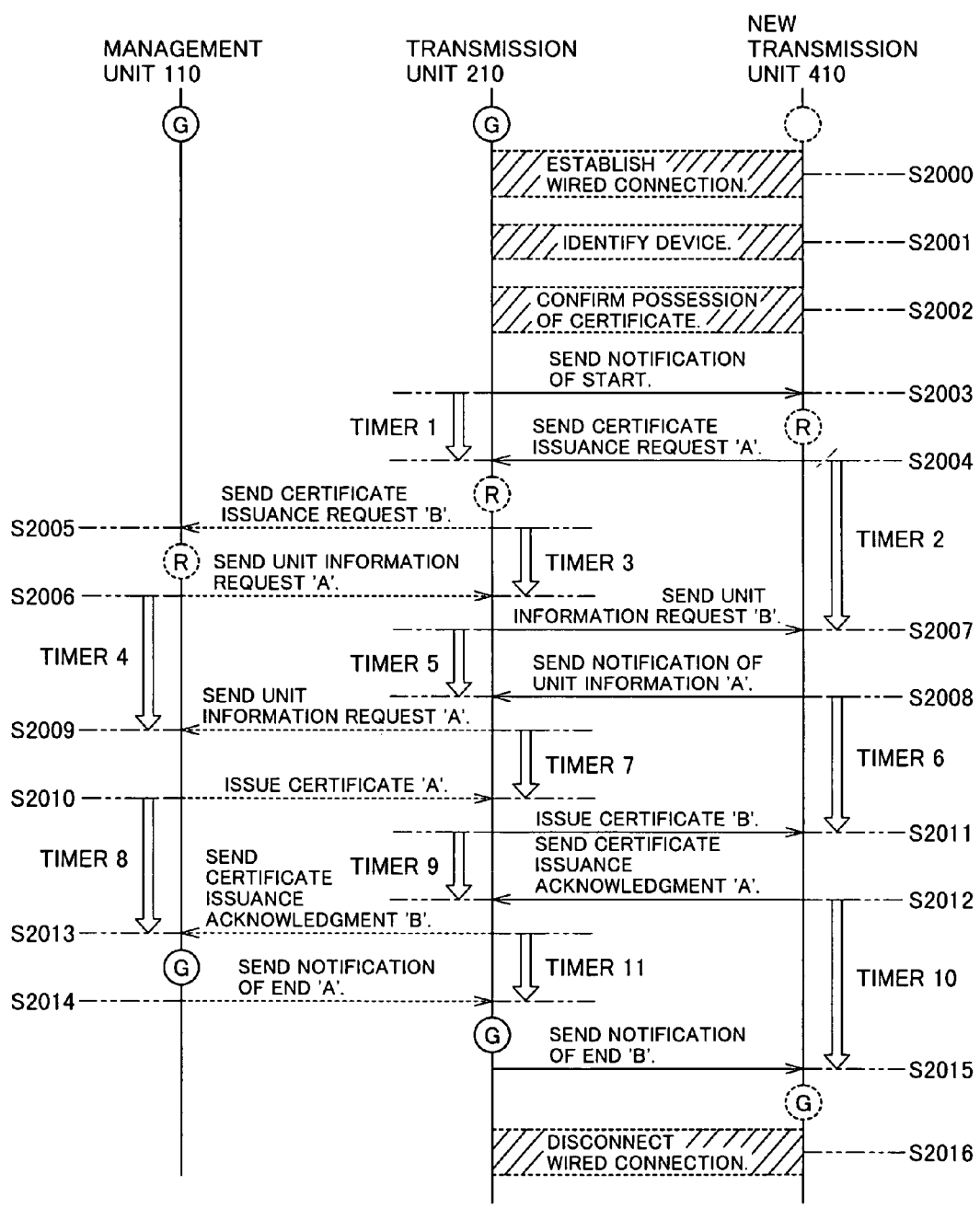
FIG. 12 is a diagram showing processes of the digital certificate issuing method according to the second embodiment.

FIG. 12 is a diagram showing the process of the digital certificate issuing method according to the second embodiment. Operations in transmitting a digital certificate when the new transmission unit 410 is connected to the transmission unit 210 and the digital certificate is issued from the management unit 110 will be described below with reference to FIG. 12. In FIG. 12, the management unit 110, the transmission unit 210, and the new transmission unit 410 have display sections for informing the user of the current status of the transmission unit. The displaying state of the green lamp and the red lamp of the display section has the same meanings as that in the first embodiment. Further, in FIG. 12, the process shown by solid arrows is performed by wire communication, and the process shown by dashed arrows is performed by wireless communication.

In step S2000 of FIG. 12, the user wire-connects the transmission unit 210 and the new transmission unit 410. At this time, since the transmission unit 210 has a digital certificate and is participating in the wireless network 300, the display section of the transmission unit 210 is in a green lamp on-state. In contrast to this, since the new transmission unit 410 has no digital certificate and is not participating in the wireless network 300, of the display section of the new transmission unit 410 is in a lamp off-state. Further, since the management unit 110 has a digital certificate and is participating in the wireless network 300, the display section of the management unit 110 is in a green lamp on-state.

In step S2001 of FIG. 12, the device identification is performed by judging whether or not the wire-connected device (new transmission unit 410) is a transmission unit having a communication means that can communicate in the wireless network 300. The detail of the device identification step is substantially the same as that of the process flow in the first embodiment, which has been described with reference to FIG. 8. FIG. 12 shows a case where the device identification step is executed by the transmission unit 210, but this step may be executed by the management unit 110.

In step S2002 of FIG. 12, the digital certificate confirmation is performed by judging whether or not the wire-connected new transmission unit 410 already has a digital certificate. The detail of the digital certificate confirmation step is substantially the same as that of the process flow shown in the first embodiment, which has been described with reference to FIG. 9. FIG. 12 shows a case where the transmission unit 210 executes the digital certificate confirmation step, but this step can be executed by management unit 110.

In step S2003 of FIG. 12, the transmission unit 210 sends a notification of start that notifies the new transmission unit 410 of the start of the digital certificate issuance process flow, and starts the timer 1. The new transmission unit 410 that received the notification of start, switches the display section to a red lamp flashing-state to inform the user that the digital certificate issuance process flow is in progress. In the next step S2004, the new transmission unit 410 sends a digital certificate issuance request 'A' to the transmission unit 210, and starts the timer 2. The transmission unit 210 that received the digital certificate issuance request 'A', switches the display section to a red lamp flashing-state to inform the user that the digital certificate issuance process flow is in progress, and stops the timer 1. If the transmission unit 210 does not receive the digital certificate issuance request 'A' before the time-out of the timer 1, the transmission unit executes its time-out process. The time-out process will be described later (steps S2224 to S2228 in FIG. 15).

In step S2004 of FIG. 12, the transmission unit 210 that received the digital certificate issuance request 'A' before the time-out of the timer 1, cannot issue a digital certificate. Therefore, the transmission unit 210 sends a digital certificate issuance request 'B' to the management unit 110 in the next step S2005, by wireless communication by means of the wireless network 300, and starts the timer 3. The management unit 110 that received the digital certificate issuance request 'B', switches its display section to a red lamp flashing-state to inform the user that the digital certificate issuance process flow is in progress.

The management unit 110 that received the digital certificate issuance request in step S2005 of FIG. 12, sends the unit information request 'A' to the transmission unit 210 in the next step S2006 in order to obtain the unit information to be written in the digital certificate, by wireless communication, and starts the timer 4. The transmission unit 210 that received the unit information request 'A' stops the timer 3. If the transmission unit 210 does not receive the unit information request 'A' before the time-out of the timer 3, the transmission unit executes its time-out process. The time-out process will be described later (steps S2224 to S2228 in FIG. 15).

The transmission unit 210 that received the unit information request before the time-out of the timer 3 in step S2006 of FIG. 12, sends the unit information request 'B' to the new transmission unit 410 by wire communication in the next step S2007, and starts the timer 5. The new transmission unit 410 that received the unit information request 'B' stops the timer 2. If the new transmission unit 410 does not receive the unit information request 'B' before the time-out of the timer 2, the transmission unit executes its time-out process. The time-out process will be described later (steps S2224 to S2228 in FIG. 15).

The new transmission unit 410 that received the unit information request 'B' before the time-out of the timer 2 in step S2007 of FIG. 12, sends the unit information notification 'A' to the transmission unit 210 by wire communication in step S2008, and starts the timer 6. The transmission unit 210 that received the unit information notification 'A' stops the timer 5. If the transmission unit 210 does not receive the unit information notification 'A' before the time-out of the timer 5, the transmission unit executes its time-out process. The time-out process will be described later (steps S2224 to S2228 in FIG. 15).

The transmission unit 210 that received the unit information notification 'A' before the time-out of the timer 5 in step S2008 of FIG. 12, the transmission unit 210 sends the unit information notification 'B' to the management unit 110 by wireless communication by means of the wireless network 300 and starts the timer 7 in the next step S2009. The management unit 110 that received the unit information notification 'B' stops the timer 4. If the management unit 110 does not receive the unit information notification 'B' before the time-out of the timer 4, the transmission unit executes its time-out process. The time-out process will be described later (steps S2111 to S2110 in FIG. 13).

The management unit 110 that received the unit information notification 'B' before the time-out of the timer 4 in step S2009 of FIG. 12, creates a digital certificate in accordance with the received unit information. In the next step S2010, the management unit 110 sends the issued digital certificate 'A' to the transmission unit 210, by wireless communication by means of the wireless network 300, and starts the timer 8. The transmission unit 210 that received the digital certificate 'A' stops the timer 7. If the transmission unit 210 does not receive the issued digital certificate 'A' before the time-out of the timer 7, the transmission unit executes its time-out process. The time-out process will be described later (steps S2224 to S2228 in FIG. 15).

The transmission unit 210 that received the issued digital certificate 'A' before the time-out of the timer 7 in step S2010 of FIG. 12, sends the issued digital certificate 'B' to the new transmission unit 410 and starts the timer 9 in the next step S2011. The new transmission unit 410 that received the issued digital certificate 'B' stops the timer 6. If the new transmission unit 410 does not receive the issued digital certificate 'B' before the time-out of the timer 6, the transmission unit executes its time-out process. The time-out process will be described later (steps S2224 to S2228 in FIG. 15).

The new transmission unit 410 that received the digital certificate 'B' before the time-out of the timer 6 in step S2011 of FIG. 12, verifies the content of the received digital certificate. If the validity of the digital certificate is confirmed, the new transmission unit 410 sends the digital certificate issuance acknowledgment 'A' to the transmission unit 210 to notify that the digital certificate has been correctly received and starts the timer 10 in the next step S2012. If the content of the digital certificate is invalid, the new transmission unit 410 sends the digital certificate issuance acknowledgment 'A' including the unit information again. The transmission unit 210 that received the digital certificate issuance acknowledgment 'A' stops the timer 9. If the transmission unit 210 does not receive the digital certificate issuance acknowledgment 'A' before the time-out of the timer 9, the transmission unit executes its time-out process. The time-out process will be described later (steps S2224 to S2228 in FIG. 15).

The transmission unit 210 that received the digital certificate issuance acknowledgment 'A' before the time-out of the timer 9 in step S2012 of FIG. 12, sends the digital certificate issuance acknowledgment 'B' to the management unit 110 by wireless communication by means of the wireless network 200 and starts the timer 11 in the next step S2013. The management unit 110 that received the digital certificate issuance acknowledgment 'B', switches the display section to a green lamp on-state again and stops the timer 8. If the management unit 110 cannot receive the digital certificate issuance acknowledgment 'B' before the time-out of the timer 8, the management unit executes its time-out process. The time-out process will be described later (steps S2111 to S2110 in FIG. 13).

In step S2013 of FIG. 12, the management unit 110 that received the digital certificate issuance acknowledgment 'B' before the time-out of the timer 8, if the validity of the issued digital certificate is confirmed, sends a notification of end 'A' for terminating the digital certificate issuance process flow to the transmission unit 210 in step S2014. The transmission unit 210 that received the notification of end 'A', switches the display section to a green lamp on-state again, and stops the timer 11. If the transmission unit 210 cannot receive the notification of end 'A' before the time-out of the timer 11, the transmission unit executes its time-out process. The time-out process will be described later (steps S2224 to S2228 in FIG. 15). In step S2013, the management unit 110 that received the digital certificate issuance acknowledgment 'B', if the issued digital certificate is invalid, creates a digital certificate again in accordance with the unit information included in the digital certificate issuance acknowledgment 'B', causes the process to go back to step S2010, and issues a digital certificate again to the new transmission unit 410.

The transmission unit 210 that received the notification of end 'A' before the time-out of the timer 11 in step S2014 of FIG. 12, the transmission unit 210 sends a notification of end 'B' to the new transmission unit 410 by wire communication in the next step S2015. The new transmission unit 410 that received the notification of end 'B' stops the timer 10. If the new transmission unit 410 does not receive the notification of end 'B' before the time-out of the timer 10, the transmission unit executes its time-out process. The time-out process will be described later (steps S2224 to S2228 in FIG. 15).

In step S2015 of FIG. 12, the new transmission unit 410 that received the notification of end 'B' before the time-out of the timer 10, switches the display section to a green lamp flashing-state to inform the user that the digital certificate issuance process flow has terminated normally and the digital certificate has been obtained. After checking the green lamp flashing-state, the user can disconnect the wired connection in step S2016. With the above-described operations, the new transmission unit 410 can obtain the digital certificate required to participate in the wireless network 300 from the management unit 110 through the transmission unit 210.

Figure 13:
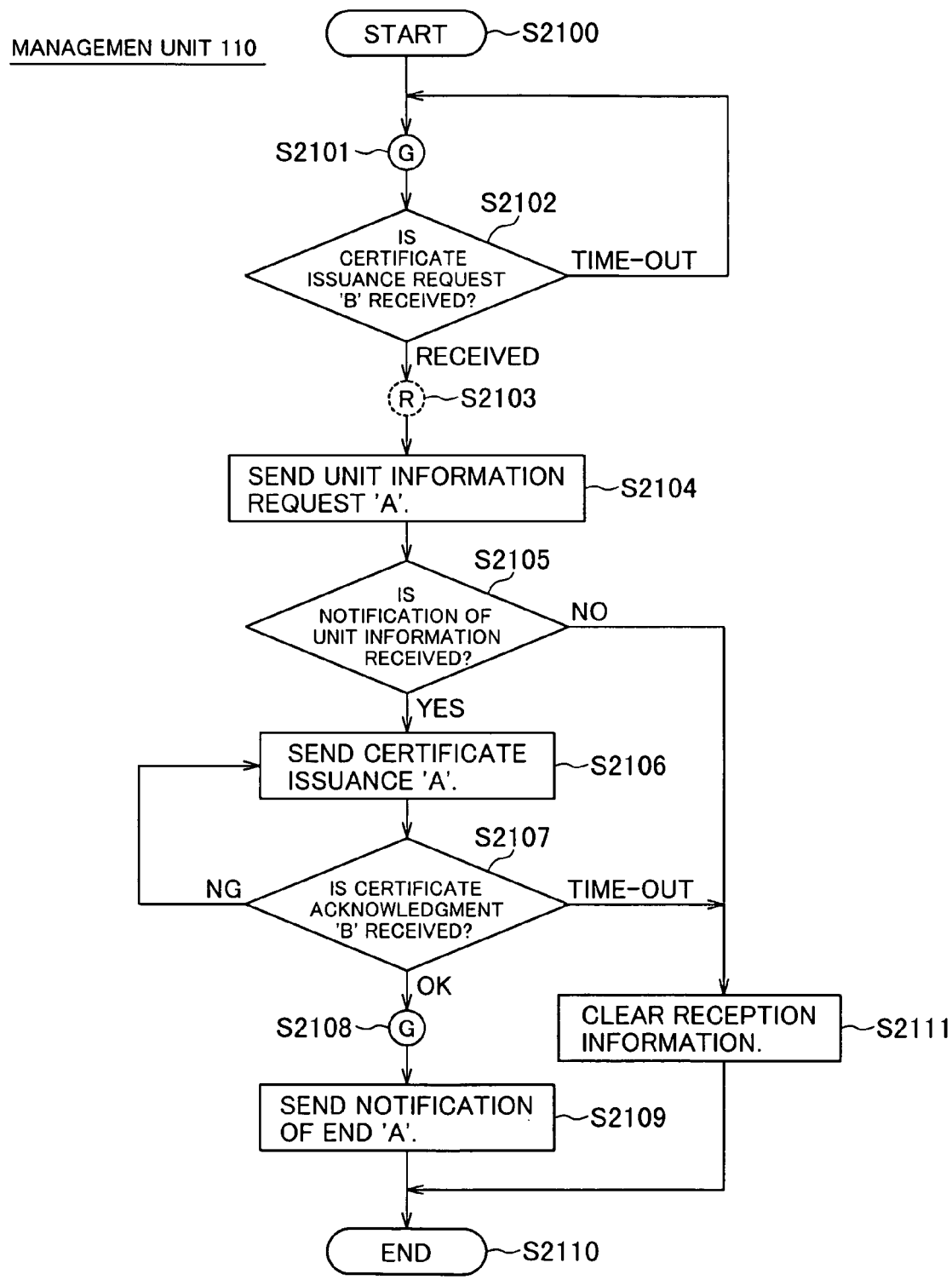
FIG. 13 is a flow chart for describing operations of the management unit in the digital certificate issuing method according to the second embodiment.

Next, operations of the management unit 110 in the second embodiment will next be described in detail. FIG. 13 is a flow chart for describing operations of the management unit 110 in the digital certificate issuing method according to the second embodiment. To be more specific, FIG. 13 shows a process flow (steps S2100 to S2111) indicating procedures in the process flow shown in FIG. 12, by which the management unit 110 issues a digital certificate to the new transmission unit 410 that is wire-connected to the transmission unit 210.

As shown in FIG. 13, since the management unit 110 has a digital certificate and is participating in the wireless network, the display section of the management unit 110 is in a green lamp on-state (step S2101).

If the management unit 110 received the digital certificate issuance request 'B' from the transmission unit 210 in step S2102 of FIG. 13, the management unit 110 switches the display section to a red lamp flashing-state in step S2103 to inform the user that the digital certificate issuance process flow is in progress.

In step S2104 of FIG. 13, the management unit 110 sends the unit information request 'A' to the transmission unit 210 in order to obtain the unit-specific information to be written in the digital certificate.

In step S2105 of FIG. 13, the management unit 110 receives a unit information notification 'B' from the transmission unit 210. If the management unit 110 cannot receive the unit information notification 'B' within a predetermined period of time, the management unit 110 clears information received during the digital certificate issuance process in step S2111, switches the display section to a green lamp on-state again in step S2112, and terminates the digital certificate issuance process flow (step S2110).

In step S2106 of FIG. 13, the management unit 110 creates a digital certificate in accordance with the unit information received from the transmission unit 210 and sends the digital certificate 'A'.

In step S2107 of FIG. 13, the management unit 110 receives the digital certificate acknowledgment 'B' indicating whether or not the new transmission unit 410 received the issued digital certificate. If the management unit 110 does not receive the digital certificate acknowledgment 'B' within a predetermined period of time, the management unit 110 clears information received during the digital certificate issuance process flow in step S2111, switches the display section to a green lamp on-state again in step S2112, and terminates the digital certificate issuance process flow (step S2110).

In step S2107 of FIG. 13, the management unit 110 that received the digital certificate acknowledgment 'B' within a predetermined period of time, If the received digital certificate acknowledgment indicates non-acceptance, creates a digital certificate again in accordance with the unit information included in the digital certificate acknowledgment 'B', causes the process to go back to step S2106, and issues a digital certificate again. If the received digital certificate acknowledgment 'B' indicates acceptance, the management unit 110 switches the display section to a green lamp on-state again in step S2108.

In step S2109 of FIG. 13, the management unit 110 sends a notification of end indicating the end of the digital certificate issuance process flow to the transmission unit 210 and terminates the digital certificate issuance process flow (step S2110).

Figure 14:
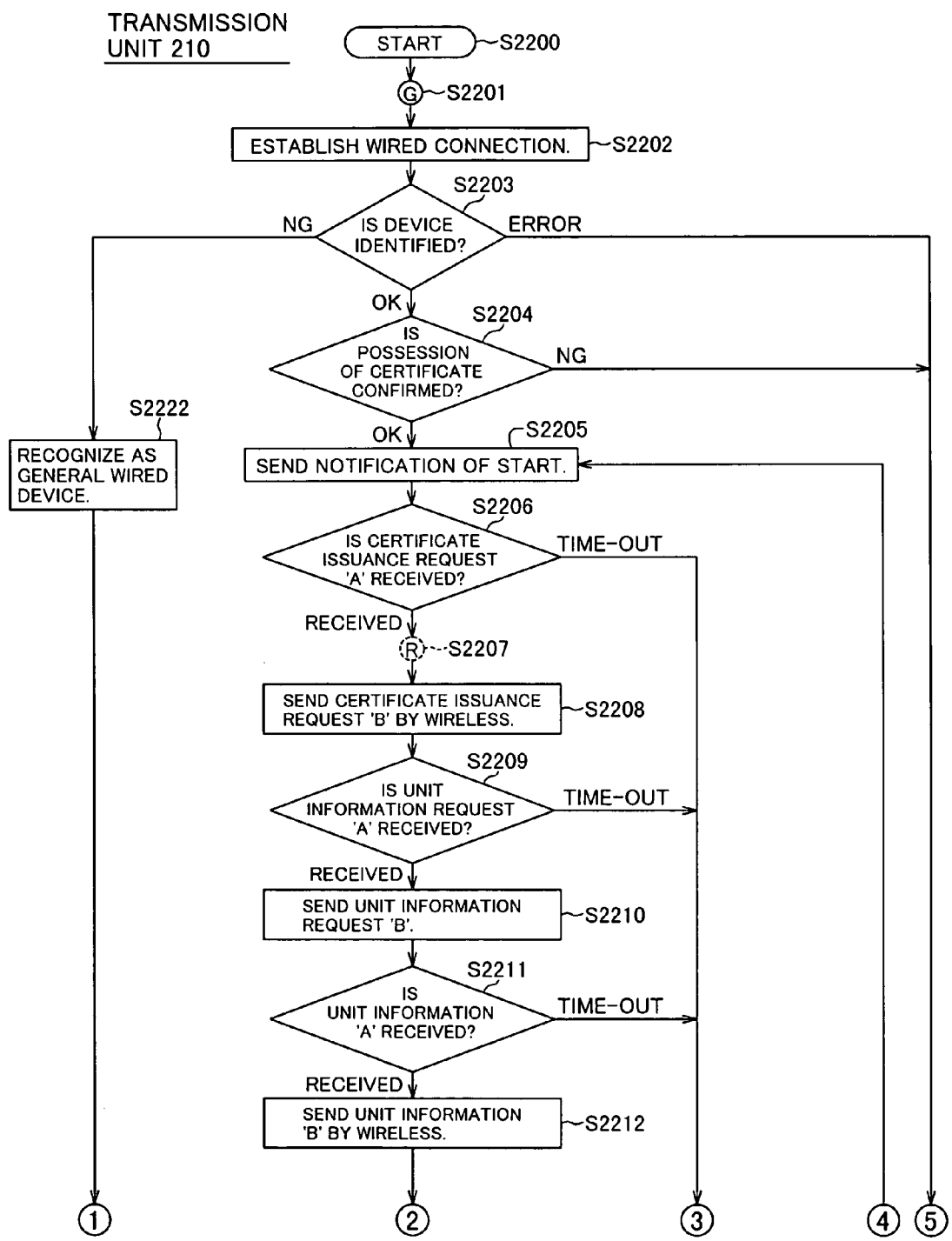
FIG. 14 is a flow chart (No. 1) showing operations of a relaying transmission unit in the digital certificate issuing method according to the second embodiment.
Figure 15:
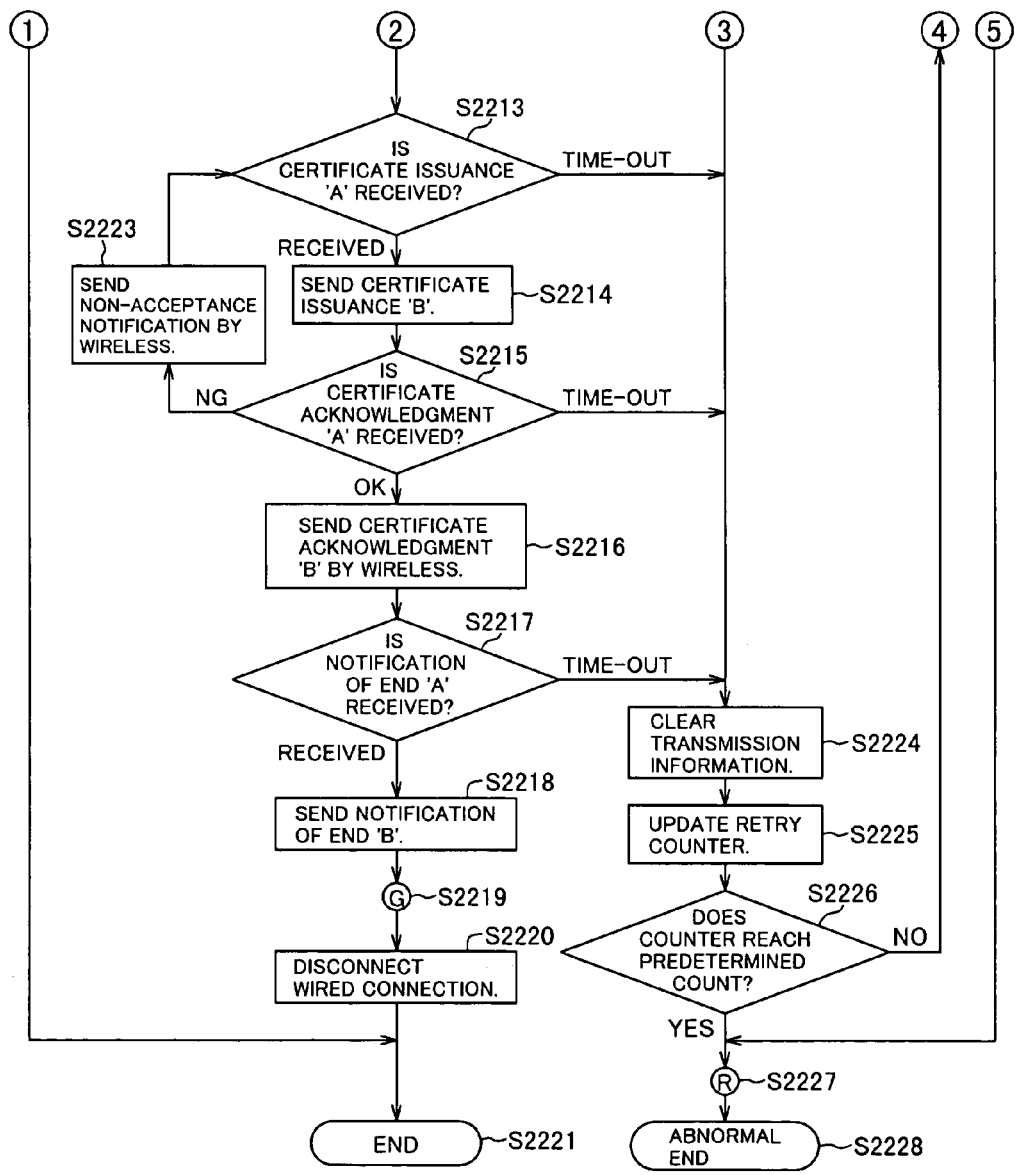
FIG. 15 is a flow chart (No. 2) showing operations of the relaying transmission unit in the digital certificate issuing method according to the second embodiment.

Next, operations of the transmission unit 210 in the second embodiment will be described in detail. FIG. 14 and FIG. 15 show flow charts for describing operations of the relaying transmission unit in the digital certificate issuing method in the second embodiment. To be more specific, FIG. 14 and FIG. 15 show a process flow indicating procedures in the process flow shown in FIG. 12, by which the transmission unit 210 relays the digital certificate issuance process flow between the management unit 110 and the new transmission unit 410 that is wire-connected to the management unit 110 (steps S2200 to S2228).

In FIG. 14, since the transmission unit 210 has a digital certificate and is participating in the wireless network 300, the display section of the transmission unit 210 is in a green lamp on-state (step S2201).

In step S2202 of FIG. 14, the user wire-connects the transmission unit 210 and the new transmission unit 410 using wired connection, by which the user is convinced of reliable security from the viewpoint of the network security.

In step S2203 of FIG. 14, the transmission unit 210 judges whether or not the wire-connected device (new transmission unit 410) is a transmission unit having a communication means that can communicate in the wireless network 300. This device identification process flow may be performed by a transmission unit other than the transmission unit 210 participating in the wireless network 300 (e.g., the management unit 110). The device identification process flow is substantially the same as the process flow shown in FIG. 8 in the first embodiment.

If the device identification process flow comes to a network participation unallowable end (NG END) in step S2203 of FIG. 14, since the connected device is not a transmission unit that can communicate in the wireless network 300 and is a general wired device, it is recognized that wired device is added to the wired network in step S2222, and the digital certificate issuance process flow ends without issuing a digital certificate (step S2221 in FIG. 15).

If the device identification process flow ends with an ERROR END in step S2203 of FIG. 14, the transmission unit 210 switches the display section to a red lamp on-state in step S2227, to inform the user that the digital certificate issuance process flow ended abnormally and terminate the digital certificate issuance process flow (step S2228 in FIG. 15).

The device identification process flow comes to a network participation allowable end (OK END) in step S2203, therefore the transmission unit 210 judges the connected device as being a transmission unit, and in step S2204 of FIG. 14, the transmission unit 210 confirms whether or not the wire-connected new transmission unit 410 already has a digital certificate. The confirmation process flow of possession of the digital certificate may be executed by a transmission unit other than the transmission unit 210 in the wireless network 300 (e.g., the management unit 110). The confirmation process flow of possession of the digital certificate is substantially the same as the process flow shown in FIG. 9 described above.

If the confirmation process flow of possession of the digital certificate comes to a network participation unallowable end (NG END) in step S2204 of FIG. 14, the transmission unit 210 switches the display section to a red lamp on-state in step S2227 to inform the user that the digital certificate issuance process flow ended abnormally, and terminates the digital certificate issuance process flow (step S2228 in FIG. 15).

In step S2205 of FIG. 14, the transmission unit 210 sends a notification of start indicating the start of the digital certificate issuance process flow to the new transmission unit 410.

In step S2206 of FIG. 14, the transmission unit 210 receives the digital certificate issuance request 'A' from the new transmission unit 410. If the transmission unit 210 does not receive the digital certificate issuance request 'A' within a predetermined period of time, the transmission unit 210 executes its time-out process of steps S2224 to S2228 in FIG. 15. If an acknowledgement cannot be received from the new transmission unit 410 and the management unit 110 due to a time-out in FIG. 14, the transmission unit 210 clears all information received in and after step S2205 (step S2224). After clearing the received information, the transmission unit 210 updates a retry counter indicating the number of times the digital certificate issuance process flow is retried (step S2225). After updating the retry counter, the transmission unit 210 confirms whether or not the retry counter has reached a predetermined number of times (step S2226). If the counter has not reached the predetermined number of times, the transmission unit 210 causes the process to go back to step S2205 and sends a notification of start again to the new transmission unit 410. If the counter has reached the predetermined number of times, the transmission unit 210 switches the display section to a red lamp on-state (step S2227), to inform the user that the process flow ended abnormally, and terminates the digital certificate issuance process flow (step S2228).

If the transmission unit 210 receives the digital certificate issuance request 'A' within a predetermined period of time in step S2206 of FIG. 14, the transmission unit 210 switches the display section to a red lamp flashing-state in step S2207 to inform the user that the digital certificate issuance process flow is in progress.

In step S2208 of FIG. 14, the transmission unit 210 sends the digital certificate issuance request 'A' received from the new transmission unit 410 by wire communication, to the management unit 110 as the digital certificate issuance request 'B' by wireless communication by means of the wireless network 300.

In step S2209 of FIG. 14, the transmission unit 210 judges whether or not the unit information request 'A' from the management unit 110 is received within a predetermined period of time by wireless communication by means of the wireless network 300. If the transmission unit 210 does not receive the unit information request 'A' within a predetermined period of time, the transmission unit 210 executes the time-out process of steps S2224 to S2228 in FIG. 15.

In step S2210 of FIG. 14, the transmission unit 210 sends the unit information request received from the management unit 110 by wireless communication by means of the wireless network 300, to the new transmission unit 410 by wire communication.

In step S2211 of FIG. 14, the transmission unit 210 receives the unit information 'A' from the new transmission unit 410 by wire communication. If the transmission unit 210 does not receive the unit information 'A' within a predetermined period of time, the transmission unit 210 executes its time-out process of steps S2224 to S2228 in FIG. 15.

In step S2212 of FIG. 14, the transmission unit 210 sends the unit information received from the new transmission unit 410 by wire communication, to the management unit 110 by wireless communication by means of the wireless network 300.

In step S2213 of FIG. 15, the transmission unit 210 judges whether or not the digital certificate issuance 'A' from the management unit 110 is received within a predetermined period of time by wireless communication by means of the wireless network 300. If the transmission unit 210 does not receive the digital certificate issuance 'A' within a predetermined period of time, the transmission unit 210 executes its time-out process of steps S2224 to S2228.

In step S2214 of FIG. 15, the transmission unit 210 sends the digital certificate issuance received from the management unit 110 by wireless communication by means of the wireless network 300, to the new transmission unit 410 by wire communication.

In step S2215 of FIG. 15, the transmission unit 210 judges whether or not the digital certificate acknowledgment 'A' is received from the new transmission unit 410 within a predetermined period of time by wire communication. If the transmission unit 210 does not receive the digital certificate acknowledgment 'A' within a predetermined period of time, the transmission unit 210 executes its time-out process of steps S2224 to S2228.

The transmission unit 210 that received the digital certificate acknowledgment 'A' within a predetermined period of time in step S2215 of FIG. 15, if the received digital certificate acknowledgment indicates non-acceptance, sends a notification of non-acceptance received by wire communication from the new transmission unit 410 to the management unit 110 by wireless communication by means of the wireless network 300 in step S2223. After that, the transmission unit 210 causes the process to go back to step S2213, where a digital certificate 'A' is received again by wireless communication by means of the wireless network 300. If the received digital certificate acknowledgment 'A' indicates acceptance, the transmission unit 210 sends the digital certificate acknowledgment received by wire communication from the new transmission unit 410 to the management unit 110 by wireless communication by means of the wireless network 300 in step S2216.

In step S2217 of FIG. 15, the transmission unit 210 judges whether or not a notification of end 'A' from the management unit 110 is received within a predetermined period of time by wireless communication by means of the wireless network 300. If the transmission unit 210 does not receive the notification of end 'A' within a predetermined period of time, the transmission unit 210 executes its time-out process of steps S2224 to S2228.

In step S2218 of FIG. 15, the transmission unit 210 sends the notification of end received from the management unit 110 by wireless communication by means of the wireless network 300 to the new transmission unit 410 by wire communication. After that, in step S2219, the transmission unit 210 switches the display section to a green lamp on-state again, to inform the user that the digital certificate issuance process flow has ended normally. After checking that the display section is switched to a green lamp on-state, the user disconnects the wired connection with the transmission unit 210 in step S2220, and terminates the digital certificate issuance process flow (step S2221).

Detail operational processes of the new transmission unit 410 in the second embodiment are substantially the same as those of the process flow shown in FIG. 10 of the first embodiment.

As has been described above, with the digital certificate issuing method according to the second embodiment, the process of issuing a digital certificate can be performed while confirming in real time the statuses of the transmission unit, the statuses including whether or not the new transmission unit 410 has a digital certificate, whether or not the management unit 110 and the transmission unit 210 is participating in the wireless network 300, whether or not the digital certificate issuance process flow is in progress in the management unit 110, the transmission unit 210, or the new transmission unit 410, and whether or not the process flow ended abnormally in the management unit 110, the transmission unit 210, or the new transmission unit 410.

Further, with the digital certificate issuing method of the second embodiment, the new transmission unit 410 is connected to the transmission unit 210 by wired connection, by which the user can be convinced of reliable security against unauthorized access from a third party, and the transmission unit 210 and the management unit 110 are connected by a wireless network ensuring its security. Accordingly, the need for entering a passphrase from a keyboard o the like is eliminated, and a digital certificate required to participate in the wireless network can be obtained through simple operations.

Furthermore, with the digital certificate issuing method of the second embodiment, even when the new transmission unit 410 is judged as being a device having a communication means which can participate in the wireless network 300, if the new transmission unit 410 already has a digital certificate, a new digital certificate is not issued so that unnecessary process can be omitted.

Moreover, with the digital certificate issuing method of the second embodiment, even when the new transmission unit 410 is judged as being a device having a communication means allowed to participate in the wireless network 300 and the new transmission unit 410 already has a digital certificate, if the already held digital certificate is a digital certificate for a network other than the wireless network 300, a digital certificate for the new transmission unit 410 is created by using the device identifier and the created digital certificate is sent to the new transmission unit 410. Accordingly, a digital certificate can be issued with reliability.

Further, with the digital certificate issuing method of the second embodiment, the new transmission unit 410 verifies the validity of the received digital certificate and, if the validity of the received digital certificate is confirmed, the new transmission unit 410 notifies the management unit 110 which has issued the digital certificate that the digital certificate has been accepted. Accordingly, the user can confirm that the digital certificate has been issued. Furthermore, the new transmission unit 410 verifies the validity of the received digital certificate and, if the validity of the received digital certificate is confirmed, the new transmission unit 410 requests the management unit 110 which has issued the digital certificate to issue a digital certificate again. Accordingly, a digital certificate can be issued certainly.

Moreover, in the description given above, the new transmission unit 410 is connected to the transmission unit 210, but the new transmission unit 410 may also be connected to any wired device (e.g., the device 220 or 230 in FIG. 1) other than the transmission unit 210 in the wired network including the transmission unit 210.

Additionally, the description given above indicates a case where if the new transmission unit 410 already has a digital certificate of the wireless network including the management unit 110, the process terminates without executing the digital certificate issuance process flow. However, the digital certificate issuance process flow may be executed to issue the digital certificate even when the new transmission unit 410 already has a digital certificate.

Description of Modified Embodiments

In the first and second embodiments, the network which does not ensure security against unauthorized access from the outside is a wireless network conforming to IEEE802.11 standard or the like. The digital certificate issuing method of the present invention can be applied to other wireless networks such as an ultra wide band (UWB) wireless network and a Bluetooth network. Further, the network to which the digital certificate issuing method of the present invention is applied is not limited to a wireless network. The digital certificate issuing method of the present invention is also applied to, for example, a power line communication (PLC) network that is a wired network using a power line, an Ethernet network, and other networks.

Furthermore, in the first and second embodiments, the network, by which the user can be convinced of apparent security against unauthorized access from the outside, is a wired network conforming to IEEE1394 standard or the like, but it is not limited to a wired network. The network, by which the user can be convinced of apparent security against unauthorized access from the outside, may be a wireless network using an infrared ray (IrDA (infrared ray data association) or the like), for example.

The invention claimed is:

1. A data sending/receiving device for issuing a digital certificate to a new data sending/receiving device, when the data sending/receiving device causes the new data sending/receiving device to participate in a wireless network formed by a plurality of data sending/receiving devices each having a digital certificate that certifies authority to participate in the wireless network; the data sending/receiving device comprising:

a first communication section which performs wireless communication in the wireless network;

a second communication section, to which the new data sending/receiving device can be connected by a wired connection means; and a control section which performs a process of issuing the digital certificate for the new data sending/receiving device through the wired connection means; wherein when the new data sending/receiving device is connected to the second communication section, the control section judges whether or not the new data sending/receiving device is a device having a communication means that can communicate in the wireless network, in accordance with device type information of the new data sending/receiving device received via the second communication section from the new data sending/receiving device, and if the new data sending/receiving device is judged as a device having the communication means that can communicate in the wireless network, the control section creates the digital certificate for the new data sending/receiving device by using a device identifier specific to the new data sending/receiving device, the device identifier being received via the second communication section from the new data sending/receiving device through the wired connection means, and sends the created digital certificate via the second communication section to the new data sending/receiving device through the wired connection means.

2. The data sending/receiving device according to claim 1, wherein even when the new data sending/receiving device is judged as being the device having the communication means which can participate in the wireless network, if the new data sending/receiving device already has a digital certificate, the control section does not issue a new digital certificate.

3. The data sending/receiving device according to claim 1, wherein even when the new data sending/receiving device is judged as being the device having the communication means which can participate in the wireless network and the new data sending/receiving device already has a digital certificate, if the digital certificate that is already held in the new data sending/receiving device is for another network different from the wireless network, the control section creates a digital certificate for the new data sending/receiving device by using the device identifier and sends the created digital certificate through the wired connection means to the new data sending/receiving device.

4. A data sending/receiving device for issuing a digital certificate to a new data sending/receiving device, when the data sending/receiving device causes the new data sending/receiving device to participate in a wireless network formed by a plurality of data sending/receiving devices including said data sending/receiving device and another data sending/receiving device each having a digital certificate that certifies authority to participate in the wireless network; the data sending/receiving device comprising:

a first communication section which performs wireless communication in the wireless network; and a control section which performs a process of issuing the digital certificate; wherein when the new data sending/receiving device is connected to a second communication section of said another data sending/receiving device by a wired connection means, the control section of said data sending/receiving device judges whether or not the new data sending/receiving device is a device having a communication means that can communicate in the wireless network, in accordance with device type information of the new data sending/receiving device received via a second communication section of said another data sending/receiving device through the wired connection means from the new data sending/receiving device; and if the new data sending/receiving device is judged as a device having the communication means that can communicate in the wireless network, the control section of said data sending/receiving device creates a digital certificate for the new data sending/receiving device by using a device identifier specific to the new data sending/receiving device, the device identifier being received through the wired connection means via said another data sending/receiving device to which the new data sending/receiving device is connected from the new data sending/receiving device, and controls to send the created digital certificate through the wired connection means via said another data sending/receiving device to which the new data sending/receiving device is connected.

5. The data sending/receiving device according to claim 4, wherein even when the new data sending/receiving device is judged as being the device having the communication means which can participate in the wireless network, if the new data sending/receiving device already has a digital certificate, the control section does not issue a new digital certificate.

6. The data sending/receiving device according to claim 4, wherein even when the new data sending/receiving device is judged as being the device having the communication means which can participate in the wireless network and the new data sending/receiving device already has a digital certificate, if the digital certificate that is already held in the new data sending/receiving device is for another network different from the wireless network, the control section creates a digital certificate for the new data sending/receiving device by using the device identifier and sends the created digital certificate through said another data sending/receiving device and the wireless connection means to the new data sending/receiving device.

7. A digital certificate issuing method for issuing a digital certificate to a new data sending/receiving device when the new data sending/receiving device participates in a wireless network formed by a plurality of data sending/receiving devices each having a digital certificate that certifies authority to participate in the wireless network, the method comprising the steps of:
connecting the new data sending/receiving device through a wired connection means to a certain data sending/receiving device participating in the wireless network;
judging by the certain data sending/receiving device, whether or not the new data sending/receiving device is a device having a communication means that can communicate in the wireless network in accordance with device type information of the new data sending/receiving device received through the wired connection means from the new data sending/receiving device; and
if the new data sending/receiving device is judged as being a device having a communication means that can communicate in the wireless network, creating a digital certificate for the new data sending/receiving device by using a device identifier specific to the new data sending/receiving device received from the new data sending/receiving device through the wired connection means and sending the created digital certificate to the new data sending/receiving device through the wired connection means, by the certain data sending/receiving device.

8. The digital certificate issuing method according to claim 7, wherein even when the new data sending/receiving device is judged as being the device having the communication means which can participate in the wireless network, if the new data sending/receiving device already has a digital certificate, a new digital certificate is not issued.

9. The digital certificate issuing method according to claim 7, wherein even when the new data sending/receiving device is judged as being the device having the communication means which can participate in the wireless network and the new data sending/receiving device already has a digital certificate, if the digital certificate that is already held in the new data sending/receiving device is for another network different from the wireless network, the creating of a digital certificate for the new data sending/receiving device by using the device identifier and the sending of the created digital certificate through the wired connection means to the new data sending/receiving device are performed.

10. The digital certificate issuing method according to claim 7, wherein the new data sending/receiving device verifies validity of the received digital certificate,
if it is confirmed that the validity exists, the new data sending/receiving device notifies the data sending/receiving device which has issued the digital certificate that the digital certificate has been accepted, and
if it is not confirmed that the validity exists, the new data sending/receiving device requests the data sending/receiving device which has issued the digital certificate to issue a digital certificate again.

11. A digital certificate issuing method for issuing a digital certificate to a new data sending/receiving device when the new data sending/receiving device participates in a wireless network formed by a plurality of data sending/receiving devices including at least a first data sending/receiving device and a second data sending/receiving device each having a digital certificate that certifies authority to participate in the wireless network, the method comprising the steps of:
connecting the new data sending/receiving device through a wired connection means to the second data sending/receiving device participating in the wireless network;
judging, by the first data sending/receiving device forming the wireless network, whether or not the new data sending/receiving device is a device having a communication means that can communicate in the wireless network in accordance with device type information of the new data sending/receiving device received through the wired connection means and the second data sending/receiving device from the new data sending/receiving device; and
if the first data sending/receiving device, which is other than the second data sending/receiving device to which the new data sending/receiving device is connected through the wired connection means, judges that the new data sending/receiving device is judged as being a device having a communication means that can communicate in the wireless network, creating a digital certificate for the new data sending/receiving device by using a device identifier specific to the new data sending/receiving device received via the second data sending/receiving device, to which the new data sending/receiving device is connected through the wired connection means, from the new data sending/receiving device and sending the created digital certificate via the second data sending/receiving device, to which the new data sending/receiving device is connected through the wired connection means, to the new data sending/receiving device, by the first data sending/receiving device.

12. The digital certificate issuing method according to claim 11, wherein even when the new data sending/receiving device is judged as being a device having a communication means which can participate in the wireless network, if the new data sending/receiving device already has a digital certificate, a new digital certificate is not issued.

13. The digital certificate issuing method according to claim 11, wherein even when the new data sending/receiving device is judged as being the device having the communication means which can participate in the wireless network and the new data sending/receiving device already has a digital certificate, if the digital certificate that is already held in the new data sending/receiving device is for another network different from the wireless network, the creating of a digital certificate for the new data sending/receiving device by using the device identifier and the sending of the created digital certificate to the new data sending/receiving device are performed.

14. The digital certificate issuing method according to claim 11, wherein the new data sending/receiving device verifies validity of the received digital certificate,
if it is confirmed that the validity exists, the new data sending/receiving device notifies the data sending/receiving device which has issued the digital certificate that the digital certificate has been accepted, and if it is not confirmed that the validity exists, the new data sending/receiving device requests the data sending/receiving device which has issued the digital certificate to issue a digital certificate again.

15. A computer readable storage medium having thereon computer executable program for performing a process of issuing the digital certificate through a wired connection means creating a wireless network, the computer program when executed causes a processor to execute steps of:

judging by a certain data sending/receiving device that is one of the data sending/receiving devices forming the wireless network and is connected through a wired connection means to the new data sending/receiving device, whether or not the new data sending/receiving device is a device having a communication means that communicates in the wireless network in accordance with device type information having the new data sending/receiving device received through the wired connection means from the new data sending/receiving device; and if the new data sending/receiving device is judged as being a device having a communication means that can communicate in the wireless network, creating a digital certificate for the new data sending/receiving device by using a device identifier specific to the new data sending/receiving device received through the wired connection means from the new data sending/receiving device and sending the created digital certificate through the wired connection means to the new data sending/receiving device, by the certain data sending/receiving device.

* * * * *